US012397552B2

(12) United States Patent
Yamazaki et al.

(10) Patent No.: US 12,397,552 B2
(45) Date of Patent: Aug. 26, 2025

(54) LIQUID EJECTION HEAD

(71) Applicant: CANON KABUSHIKI KAISHA, Tokyo (JP)

(72) Inventors: Takuro Yamazaki, Tokyo (JP); Yoshiyuki Nakagawa, Kanagawa (JP); Akiko Hammura, Tokyo (JP); Atsushi Teranishi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 130 days.

(21) Appl. No.: 18/125,220

(22) Filed: Mar. 23, 2023

(65) Prior Publication Data

US 2023/0302796 A1 Sep. 28, 2023

(30) Foreign Application Priority Data

Mar. 24, 2022 (JP) ................................ 2022-048587

(51) Int. Cl.
*B41J 2/14* (2006.01)
*B41J 2/16* (2006.01)

(52) U.S. Cl.
CPC ........... *B41J 2/14233* (2013.01); *B41J 2/161* (2013.01); *B41J 2002/14241* (2013.01); *B41J 2002/14266* (2013.01); *B41J 2002/14306* (2013.01)

(58) Field of Classification Search
CPC .......... B41J 2/14233; B41J 2002/14419; B41J 2202/20; B41J 2202/12; B41J 2002/14225;

(Continued)

(56) References Cited

U.S. PATENT DOCUMENTS 8,662,650 B2 3/2014 Ono et al.
11,123,985 B2 * 9/2021 Mizuno ................ B41J 2/14233

(Continued)

FOREIGN PATENT DOCUMENTS

JP 2006-347036 A 12/2006
JP 2013-203062 A 10/2013

OTHER PUBLICATIONS

U.S. Appl. No. 18/126,664, Akiko Hammura Yoshiyuki Nakagawa Takura Yamazaki Atsushi Teranishi, filed Mar. 27, 2023.

(Continued)

*Primary Examiner* — Kristal Feggins
(74) *Attorney, Agent, or Firm* — Venable LLP

(57) ABSTRACT

A liquid ejection head includes a plurality of nozzles arranged along a first direction of an ejection surface, a plurality of pressure chambers communicating with the plurality of individual nozzles and provided with actuators configured to apply, to a liquid, pressures for ejecting the liquid from the nozzles, a plurality of discrete flow paths communicating with the plurality of individual pressure chambers, a common flow path communicating with the plurality of individual discrete flow paths via discrete opening portions and extending in the first direction, and a damper mechanism disposed to face the common flow path in a direction crossing the ejection surface to absorb a pressure fluctuation in the liquid in the common flow path. The common flow path is provided with a partition wall disposed between the discrete opening portions adjacent in the first direction to extend in the direction crossing the ejection surface.

14 Claims, 14 Drawing Sheets

(58) Field of Classification Search
CPC ...... B41J 2002/1425; B41J 2002/14266; B41J 2002/14306; B41J 2002/14241; B41J 2/055; B41J 2/161; B41J 2/14201; B41J 2002/14403
See application file for complete search history.

(56) References Cited

U.S. PATENT DOCUMENTS

| | | | | |
|---|---|---|---|---|
| 2019/0232659 | A1* | 8/2019 | Takabe ................. | H10N 30/883 |
| 2022/0227133 | A1* | 7/2022 | Knechten ............. | H10N 30/875 |

OTHER PUBLICATIONS

U.S. Appl. No. 18/126,687, Yoshiyuki Nakagawa Takura Yamazaki Akiko Hammura Atsushi Teranishi, filed Mar. 27, 2023.
U.S. Appl. No. 18/126,674, Akiko Hammura Yoshiyuki Nakagawa Takuro Yamazaki Atsushi Teranishi, filed Mar. 27, 2023.

* cited by examiner

LIQUID EJECTION HEAD

BACKGROUND OF THE INVENTION

Field of the Invention

The present invention relates to a liquid ejection head.

Description of the Related Art

In a liquid ejection head to be used in a liquid ejection apparatus that ejects a liquid such as ink, an ejection surface is provided with a plurality of nozzles, and a pressure chamber having an actuator such as a piezoelectric element that applies a pressure to the liquid to eject droplets from the nozzles is provided. A pressure fluctuation applied to the liquid in the pressure chamber for droplet ejection may affect characteristics of subsequent droplet ejection. The droplet ejection characteristics include an ejection speed, a droplet volume, a state of coherence of droplets, and the like. When the droplet ejection characteristics change, droplet landing positions on a paper surface, an area of the droplets after landing, the number of the landing droplets, and the like change in a printing apparatus using the liquid ejection head to affect a printing quality. Meanwhile, a technology including a damper mechanism that absorbs a pressure fluctuation in a liquid resulting from droplet ejection is known. Each of Japanese Patent Application Publication No. 2006-347036 and Japanese Patent Application Publication No. 2013-203062 describes a technology of disposing a damper chamber at a position facing a flow path for a liquid in a direction crossing an ejection surface, disposing a flexible damper wall between the damper chamber and the flow path, and using warping of the damper wall to absorb a pressure fluctuation in the liquid in the flow path.

SUMMARY OF THE INVENTION

A configuration of a liquid ejection head is known that includes a common flow path commonly communicating with a plurality of pressure chambers individually communicating with a plurality of nozzles and extending in a direction in which the plurality of nozzles are arranged, supplies a liquid from the outside to the common flow path, and distributes the liquid from the common flow path to the individual pressure chambers. In the technology of each of Japanese Patent Application Publication No. 2006-347036 and Japanese Patent Application Publication No. 2013-203062, a damper mechanism facing such a common flow path in the direction crossing the ejection surface is disposed. However, such a damper mechanism cannot sufficiently inhibit propagation of the pressure fluctuation in the direction in which the plurality of nozzles are arranged in the common flow path. Due to the pressure fluctuation propagating in the direction in which the plurality of nozzles are arranged in the common flow path, a pressure fluctuation occurring in a given one of the pressure chambers may affect characteristics of droplet ejection from the nozzles of another of the pressure chambers communicating therewith via the common flow path.

In view of the foregoing problem to be solved, an object of the present invention is to inhibit, in a liquid ejection head in which a plurality of nozzles communicate with each other via a common flow path, a pressure fluctuation resulting from droplet ejection from affecting droplet ejection from another nozzle communicating via the common flow path.

The present invention is a liquid ejection head configured to eject a liquid from an ejection surface, the liquid ejection head comprising:

- a plurality of nozzles arranged along a first direction of the ejection surface;
- a plurality of pressure chambers communicating with the plurality of individual nozzles and provided with actuators configured to apply, to the liquid, pressures for ejecting the liquid from the nozzles;
- a plurality of discrete flow paths communicating with the plurality of individual pressure chambers;
- a common flow path communicating with the plurality of individual discrete flow paths via discrete opening portions and extending in the first direction; and
- a damper mechanism disposed to face the common flow path in a direction crossing the ejection surface to absorb a pressure fluctuation in the liquid in the common flow path,
- the common flow path being provided with a partition wall disposed between the discrete opening portions adjacent in the first direction to extend in the direction crossing the ejection surface.

The present invention is a liquid ejection head configured to eject a liquid from an ejection surface, the liquid ejection head comprising:

- a plurality of nozzles arranged along a first direction of the ejection surface;
- a plurality of pressure chambers communicating with the plurality of individual nozzles and provided with actuators configured to apply, to the liquid, pressures for ejecting the liquid from the nozzles;
- a plurality of discrete flow paths communicating with the plurality of individual pressure chambers;
- a common flow path communicating with the plurality of individual discrete flow paths and extending in the first direction; and
- a damper mechanism disposed to face the common flow path in a direction crossing the ejection surface to absorb a pressure fluctuation in the liquid in the common flow path,
- the common flow path being provided with a partition wall that partially blocks a flow of the liquid along the first direction.

According to the present invention, it is possible to inhibit, in the liquid ejection head in which the plurality of nozzles communicate with each other via the common flow path, the pressure fluctuation resulting from droplet ejection from affecting droplet ejection from another nozzle communicating via the common flow path.

Further features of the present invention will become apparent from the following description of exemplary embodiments with reference to the attached drawings.

DESCRIPTION OF THE EMBODIMENTS

Figure 1:
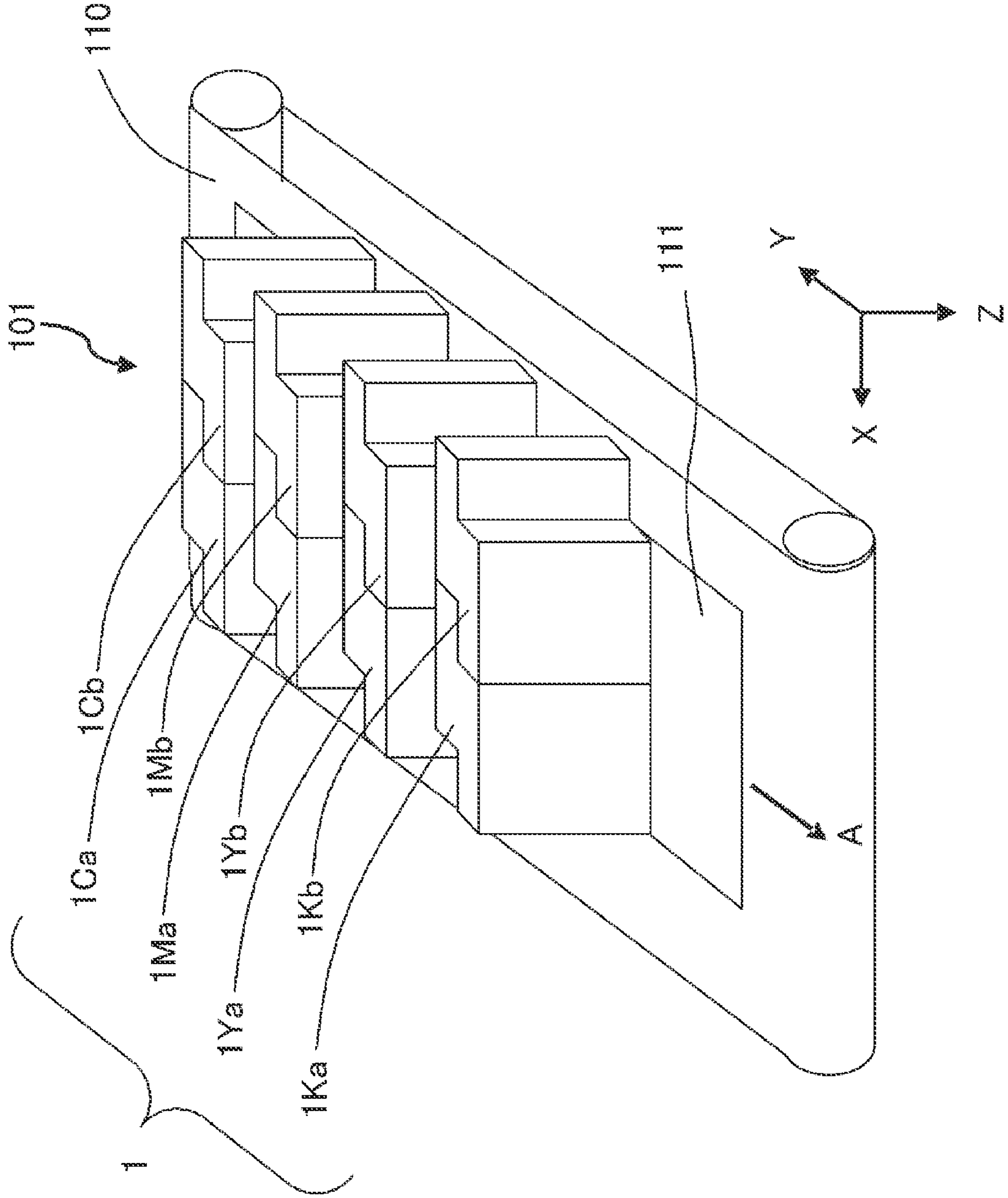
FIG. 1 is a schematic configuration diagram of an inkjet recording apparatus.

Referring to the drawings, a description will be given below of a liquid ejection head and a liquid ejection apparatus according to each of embodiments of the present invention. The following will describe the embodiment in which the present invention is applied to an inkjet recording head that ejects ink as an example of a liquid and to an inkjet recording apparatus, but the present invention is also applicable to another apparatus. For example, the present invention is applicable to apparatuses such as a printer, a copier, a fax machine having a communication system, and a word processor having a printer unit and to industrial recording apparatuses compositely combined with various processing apparatuses, e.g., apparatus that perform biochip fabrication, electronic circuit printing, and the like. A configuration in each of the following embodiments is for illustrative purposes, and various combinations and modifications are possible within the scope of the present invention.

Description of Entire Head

FIG. 1 is a schematic configuration diagram of an inkjet recording apparatus 101 according to each of the embodiments. The inkjet recording apparatus 101 is a one-pass type recording apparatus that uses a liquid ejection head module 1 to record an image on a recording medium 111 while the recording medium 111 is transported once by a transport unit 110. It is assumed hereinbelow that a width direction of the recording medium 111 is an X-direction, a direction (indicated by an arrow A) in which the recording medium 111 is transported is a Y-direction, and a direction crossing each of the X-direction and the Y-direction is a Z-direction. The X-direction and the Y-direction are directions along an ejection surface formed with nozzles of the liquid ejection head module 1 (described later), the X-direction (first direction) is a direction in which the nozzles are arranged, and the Y-direction (second direction) is a direction in which nozzle rows are arranged. The Y-direction (second direction) is a direction crossing the X-direction (first direction) along the ejection surface. Typically, the X-direction and the Y-direction are perpendicular to each other along a horizontal plane, while the Z-axis is parallel to a vertical direction.

The liquid ejection head module 1 includes discrete modules that eject cyan, magenta, yellow, and black inks. In the case of distinguishing the liquid ejection head modules for the individual colors from each other, the liquid ejection head modules are provided with marks C, M, Y, and K to be distinguished from each other. The liquid ejection head modules for the four colors are arranged along the direction (Y-direction) in which the recording medium 111 is transported. Each of the liquid ejection head modules for the individual colors has sub-modules arranged along the width direction (X-direction) of the recording medium 111. In the case of distinguishing the sub-modules from each other, the sub-modules are provided with marks a and b to be distinguished from each other. In FIG. 1, the liquid ejection head module 1 is disposed vertically above the recording medium 111 to eject the inks vertically downward (in the Z-direction). Note that a configuration of the liquid ejection head module 1 illustrated in FIG. 1 is exemplary, and the present invention is also applicable to a liquid ejection head module in another form.

Description of Configuration of Liquid Ejection Head

Figure 2A:
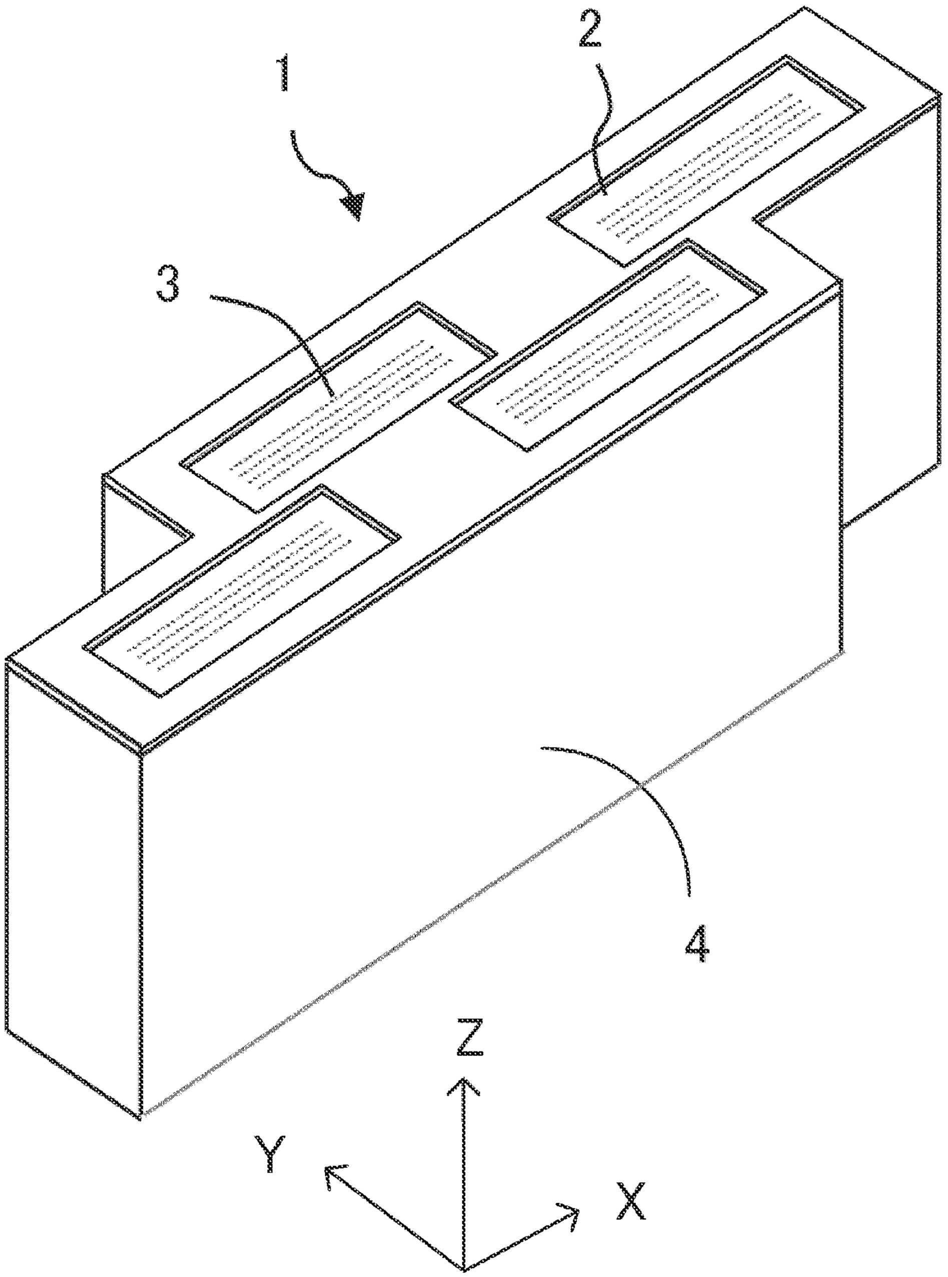
FIG. 2A is a schematic view of a liquid ejection head module.
Figure 2B:
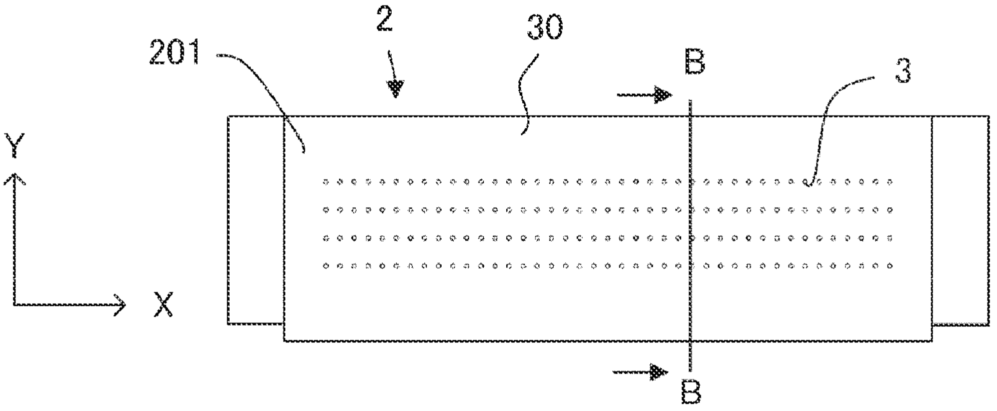
FIGS. 2B and 2C are schematic views of the liquid ejection head module.
Figure 2C:
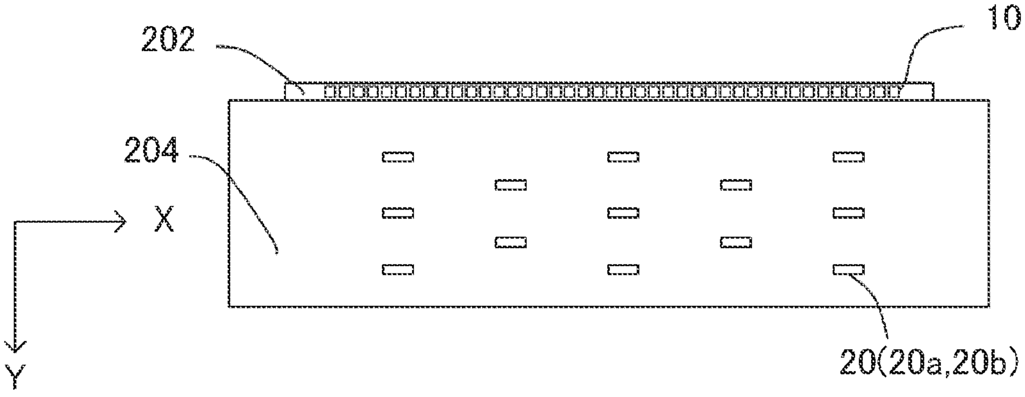

FIGS. 2A to 2C are schematic views of the liquid ejection head module 1. FIG. 2A is a perspective view obtained by viewing the liquid ejection head module 1 from an ejection surface side. FIG. 2B is a diagram illustrating the ejection surface of each of liquid ejection substrates 2. FIG. 2C is a diagram illustrating a surface of the liquid ejection substrate 2 opposite to the ejection surface.

The liquid ejection head module 1 has a head main body 4 and the plurality of liquid ejection substrates 2 disposed in the head main body 4. The liquid ejection head module 1 has a plurality of nozzles 3 arranged in the X-direction (first direction) along ejection surfaces 30 of the liquid ejection substrates 2.

Each of the liquid ejection substrates 2 has a nozzle substrate 201, and the plurality of nozzles 3 are arranged along a longitudinal direction (X-direction) of the nozzle substrate 201 to form the nozzle rows. In the nozzle substrate 201, the plurality of nozzle rows are arranged along a transverse direction (Y-direction). Each of the liquid ejection substrates 2 has a flow path formation substrate 204 and, via external supply opening portions 20 formed in the flow path formation substrate 204, the ink is supplied from an external ink tank to the liquid ejection substrate 2. The supplied ink flows in flow paths in the liquid ejection substrate 2 to be ejected from the nozzles 3 and drop onto the recording medium 111. To the plurality of external supply opening portions 20, the ink is supplied from the ink tank (not shown) via a common feeding port (not shown) provided in the head main body 4.

In the head main body 4, an electric circuit substrate (not shown) for supplying electric power and a signal for driving actuators such as piezoelectric elements that eject the ink from the nozzles 3 is disposed. The electric circuit substrate is connected via wiring (not shown) to terminals 10 of a vibration substrate 202 provided with the actuators of the liquid ejection substrate 2. Note that a configuration of the liquid ejection head module 1 illustrated in FIGS. 2A to 2C is exemplary, and the present invention is also applicable to a liquid ejection head module in another form.

Description of Configuration of Liquid Ejection Substrate

Figure 3A:
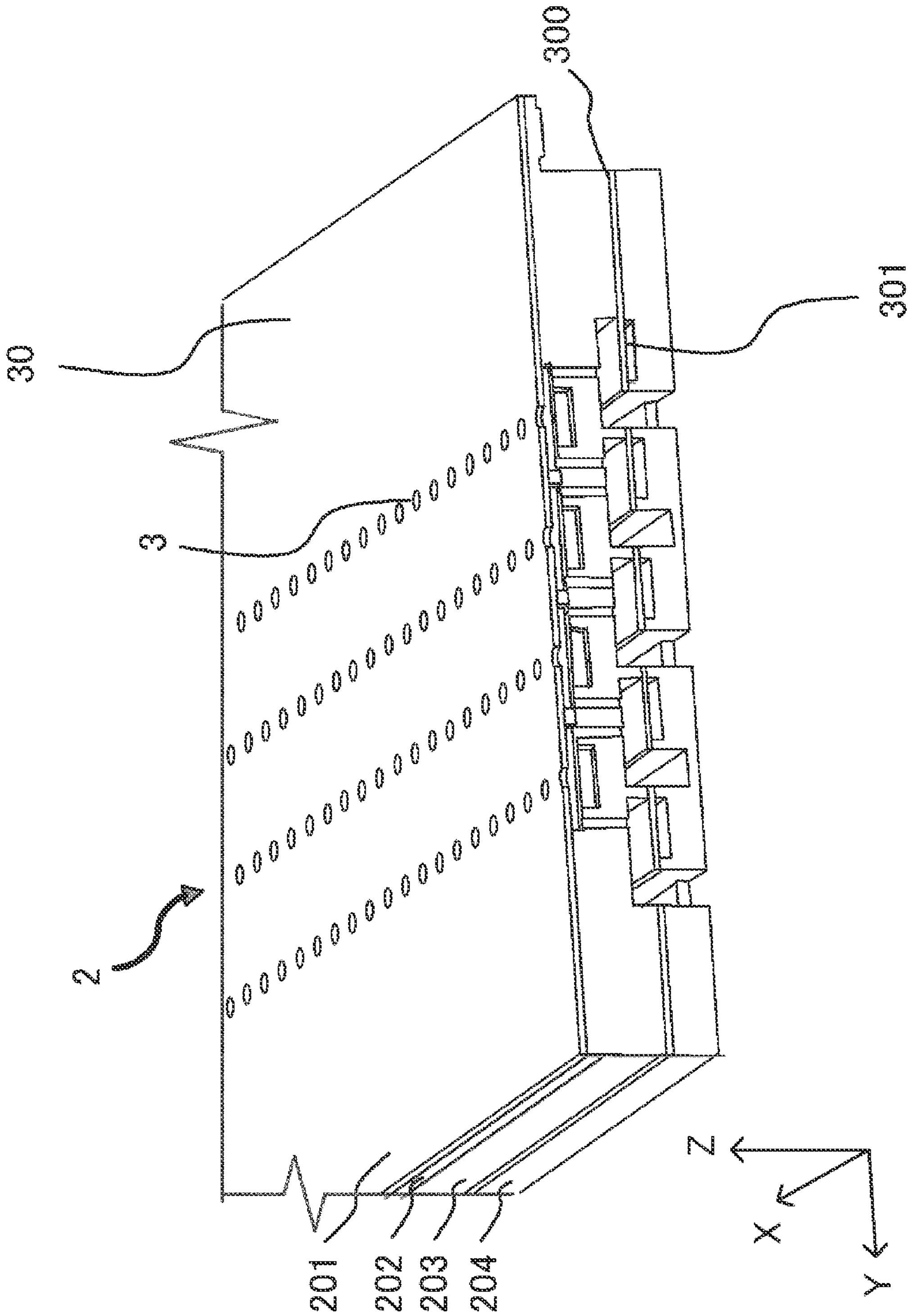
FIG. 3A is a schematic cross-sectional view of a liquid ejection substrate.
Figure 3B:
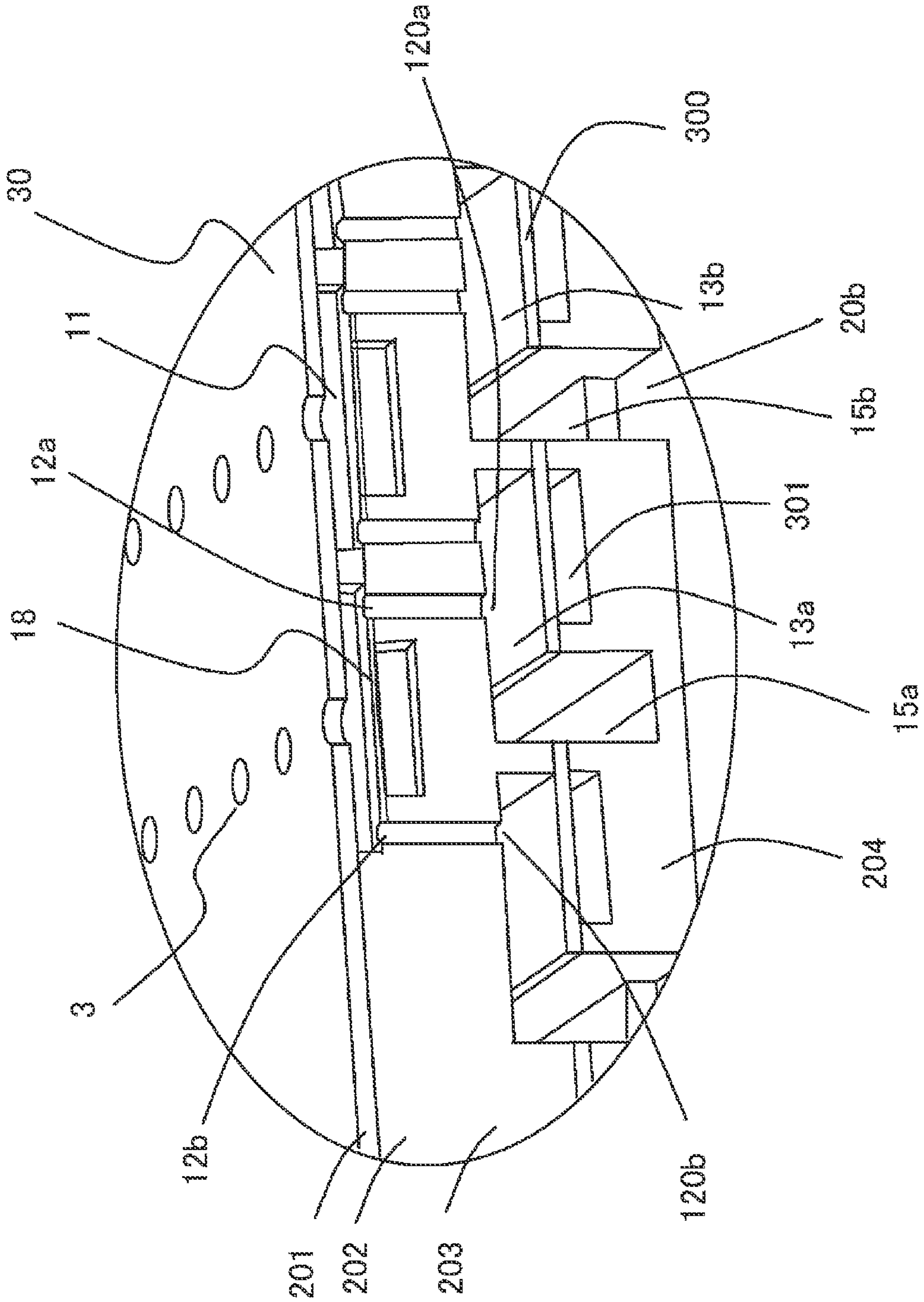
FIG. 3B is a schematic cross-sectional view of the liquid ejection substrate.

FIGS. 3A and 3B are schematic cross-sectional views of each of the liquid ejection substrates 2. FIG. 3A illustrates a B-B cross section in FIG. 2B. FIG. 3B is a diagram illustrating a part of FIG. 3A in enlarged relation.

The liquid ejection substrate 2 is configured by joining together four substrates, i.e., the nozzle substrate 201, the vibration substrate 202, a liquid supply substrate 203, and the flow path formation substrate 204. Between the liquid supply substrate 203 and the flow path formation substrate 204, a damper member 300 is interposed. The flow path formation substrate 204 is provided with depressed portions extending in the X-direction (first direction), and the damper member 300 and the depressed portions form damper chambers each corresponding to a space extending in the X-direction (first direction). This space serves as a space in which a gas (which is typically atmospheric air) is present. This space and the damper member 300 are included in each of damper mechanisms 301 that absorbs a pressure fluctuation in the liquid.

A plurality of pressure chambers 11 are formed to communicate with each of the plurality of nozzles 3, and the plurality of pressure chambers 11 are individually provided with piezoelectric elements 18 serving as the actuators that apply, to the liquid, pressures for ejecting the liquid from the nozzles 3. The piezoelectric elements 18 are provided in deformable wall surfaces made of the vibration substrate 202, and any of the piezoelectric elements 18 deforms the vibration substrate 202 to thereby apply a pressure to the liquid in the pressure chamber 11 and eject droplets from the nozzles 3.

A plurality of discrete flow paths are formed to individually communicate with the plurality of individual pressure chambers 11, and a common flow path is formed to communicate with the plurality of individual discrete flow paths via discrete opening portions and extend in the X-direction (first direction). In the example in FIG. 3B, the discrete flow paths include discrete supply flow paths 12*a* that supply the liquid to the pressure chambers 11 and discrete discharge flow paths 12*b* that discharge the liquid from the pressure chambers 11. The common flow path is formed in the liquid supply substrate 203. In the example in FIG. 3B, the common flow path includes common supply flow paths 13*a* individually communicating with the plurality of discrete supply flow paths 12*a* via discrete supply opening portions 120*a* and common discharge flow paths 13*b* individually communicating with the plurality of discrete discharge flow paths 12*b* via discrete discharge opening portions 120*b*.

The damper member 300 is disposed to face the common flow path in the direction (Z-direction) crossing the ejection surface 30 to absorb a pressure fluctuation in the liquid in the common flow path. In the example in FIG. 3B, wall surfaces of the common supply flow paths 13*a* facing the discrete supply flow paths 12*a* are formed of the damper member 300, and accordingly the damper mechanisms 301 are disposed at positions facing the discrete supply flow paths 12*a*. Meanwhile, wall surfaces of the common discharge flow paths 13*b* facing the discrete discharge flow paths 12*b* are formed of the damper member 300, and accordingly the damper mechanisms 301 are disposed at positions facing the discrete discharge flow paths 12*b*. Note that the damper member 300 may also be configured to be disposed to face at least either of the common supply flow path 13*a* and the common discharge flow path 13*b* in the direction (Z-direction) crossing the ejection surface 30.

The plurality of common supply flow paths 13*a* individually communicate with a plurality of supply connection flow paths 15*a* formed in the flow path formation substrate 204. The plurality of supply connection flow paths 15*a* are individually formed with a plurality of external supply opening portions 20*a*, and the liquid is supplied from the outside via the external supply opening portions 20*a*. The plurality of common discharge flow paths 13*b* individually communicate with a plurality of discharge connection flow paths 15*b* formed in the flow path formation substrate 204. The plurality of discharge connection flow paths 15*b* are individually formed with a plurality of external discharge opening portions 20*b*, and the liquid is discharged to the outside via the external discharge opening portions 20*b*.

Each of the nozzle substrate 201, the vibration substrate 202, the liquid supply substrate 203, and the flow path formation substrate 204 is made of a silicon substrate or the like. Note that a configuration and the number of the substrates forming each of the liquid ejection substrates 2 are not limited to those in this example. The damper member 300 is formed of an elastic material, and a resin material such as, e.g., polyimide or polyamide can be used.

Figure 4:
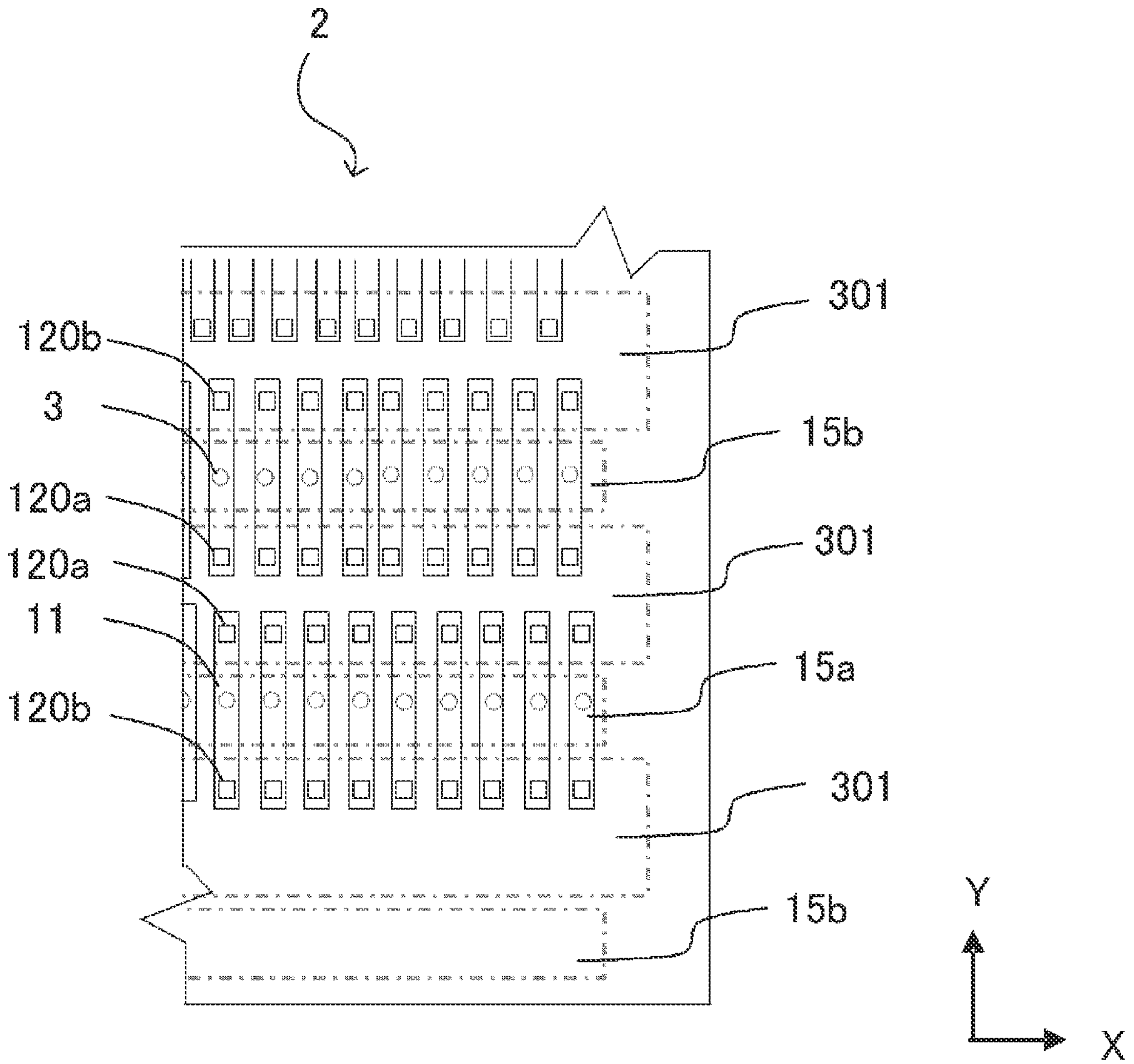
FIG. 4 is a schematic perspective plan view of the liquid ejection substrate.

FIG. 4 is a perspective plan view illustrating a part of the liquid ejection substrate 2. The liquid ejection substrate 2 has the plurality of nozzles 3 and the plurality of pressure chambers 11 connected individually to the plurality of nozzles 3. The plurality of nozzles 3 are arranged along the X-direction (first direction) to form one nozzle row, and a plurality of such nozzle rows are formed along the Y-direction (second direction). Both ends of each of the pressure chambers 11 in the longitudinal direction (Y-direction) are formed with the discrete supply opening portion 120*a* communicating with the discrete supply flow path 12*a* and with the discrete discharge opening portion 120*b* communicating with the discrete discharge flow path 12*b*. In positional relationships along the ejection surface (XY plane), each of the damper mechanisms 301 is disposed so as to include positions of the discrete supply opening portions 120*a* and each of the damper mechanisms 301 is disposed so as to include positions of the discrete discharge opening portions 120*b*. Meanwhile, in the positional relationships along the ejection surface (XY plane), the damper mechanisms 301 overlap neither the supply connection flow paths 15*a* nor the discharge connection flow paths 15*b* on the XY plane. Note that the positional relationship between the damper mechanisms 301 and each of the supply connection flow paths 15*a* and the discharge connection flow paths 15*b* is not limited to that in the example in FIG. 4.

A configuration of the liquid ejection substrate 2 illustrated in FIGS. 3A and 3B and FIG. 4 is an example of a liquid ejection substrate to which the present invention is applicable, and a configuration of the liquid ejection substrate to which the present invention is applicable is not limited to that in this example. For example, in the liquid ejection substrate 2 illustrated in FIGS. 3A and 3B and FIG. 4, the ink supplied from the external ink tank to the liquid ejection substrate 2 passes through the pressure chambers 11, and a part of the ink is ejected from the nozzles 3, while the other part thereof circulates so as to return to the external ink tank. However, the present invention is also applicable to the liquid ejection substrate 2 not having such a circulation flow path. Each of the following first and second embodiments is an example in which the present invention is applied to the liquid ejection substrate 2 having no circulation flow path, while each of the following third and fourth embodiments is an example in which the present invention is applied to the liquid ejection substrate 2 having a circulation flow path.

In the liquid ejection substrate 2 illustrated in FIGS. 3A and 3B and FIG. 4, in the direction (Z-direction) crossing the ejection surface, the common flow paths 13*a* and 13*b* and the damper mechanisms 301 are disposed opposite to the nozzles 3 with respect to the pressure chambers 11. However, the present invention is also applicable to the liquid ejection substrate 2 in which, in the direction (Z-direction) crossing the ejection surface, the common flow path and the damper mechanisms are disposed on the same side as that of the nozzles with respect to the pressure chambers. Each of the following first, third, and fourth embodiments is the example in which the present invention is applied to the liquid ejection substrate 2 in which, in the direction (Z-direction) crossing the ejection surface, the common flow path and the damper mechanism are disposed opposite to the nozzles with respect to the pressure chambers. The second embodiment is the example in which the present invention is applied to the liquid ejection substrate 2 in which, in the direction (Z-direction) crossing the ejection surface, the common flow path and the damper mechanisms are disposed on the same side as that of the nozzles with respect to the pressure chambers.

First Embodiment

Figure 5A:
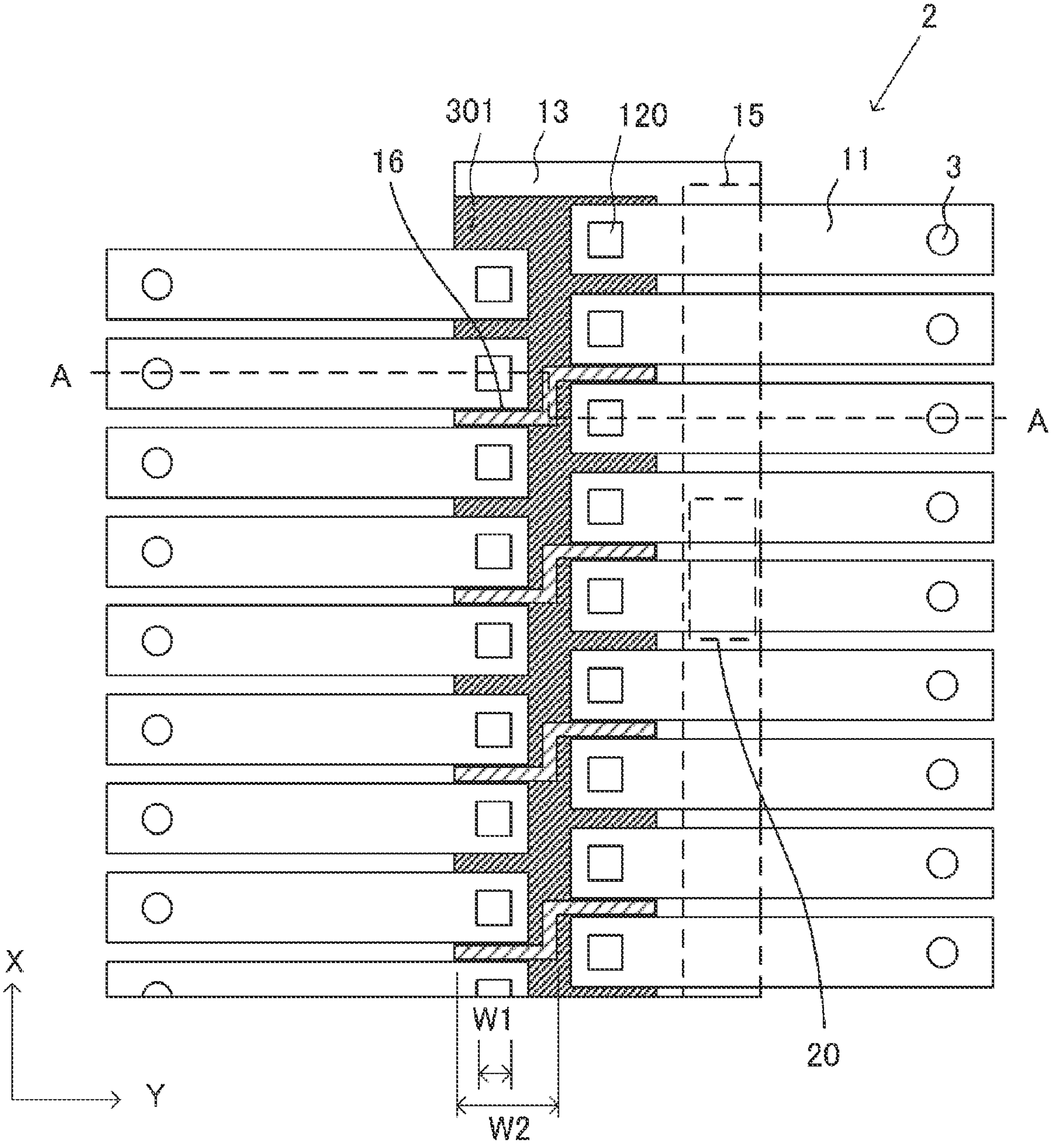
FIG. 5A is a schematic diagram of the liquid ejection substrate according to a first embodiment of the present invention.
Figure 5B:
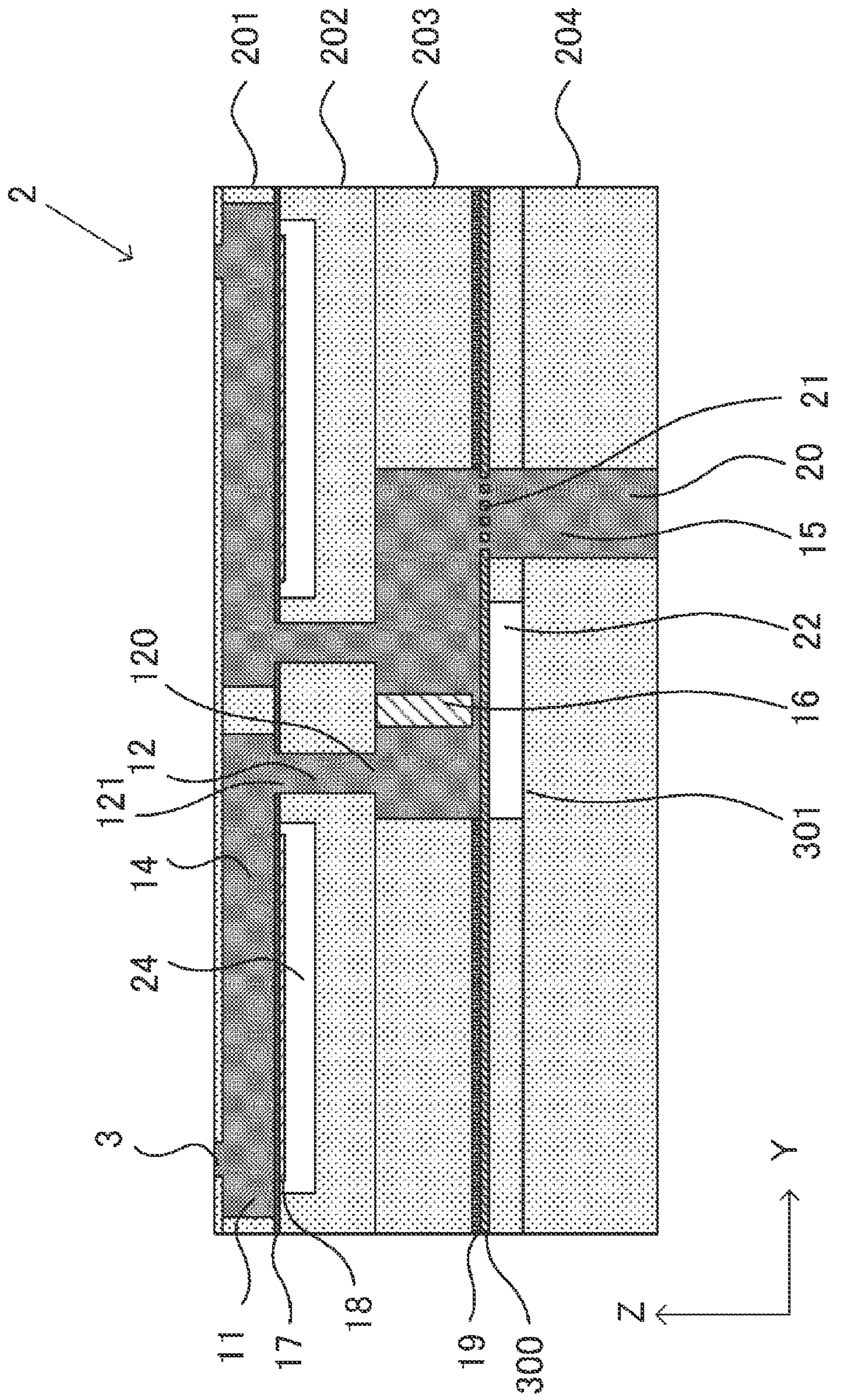
FIG. 5B is a schematic diagram of the liquid ejection substrate according to the first embodiment of the present invention.

Referring to FIGS. 5A and 5B, a description will be given of the liquid ejection substrate in the first embodiment of the present invention. FIG. 5A is a plan view illustrating a portion of the liquid ejection substrate 2 in the first embodiment. FIG. 5B is a cross-sectional view along an A-A line in FIG. 5A.

In the liquid ejection substrate 2, the plurality of nozzles 3 are arranged in the X-direction (first direction) to form one nozzle row, and the plurality of nozzles rows are arranged in the Y-direction (second direction). In FIG. 5A, a part of each of the two nozzle rows is illustrated.

In the liquid ejection substrate 2, the plurality of pressure chambers 11 are arranged along the X-direction. Sides of the pressure chambers 11 extending along the X-direction of the pressure chambers 11 are short sides, while sides thereof extending along the Y-direction are long sides. One end portions of the pressure chambers 11 in the longitudinal direction (Y-direction) are formed with the nozzles 3, while other end portions thereof communicate with discrete flow paths 12. The plurality of individual pressure chambers 11 communicate with the common flow path 13 via the discrete flow paths 12. The plurality of discrete flow paths 12 communicating with the plurality of individual pressure chambers 11 included in the two nozzle rows illustrated in FIG. 5A communicate with the same common flow path 13. The common flow path 13 communicates with connection flow paths 15, and the connection flow paths 15 communicate with the external ink tank via external opening portions 20.

The common flow path 13 communicates with the discrete flow paths 12 via the discrete opening portions 120, and each of the damper mechanisms 301 is disposed so as to face the discrete opening portions 120 in the direction (Z-direction) crossing the ejection surface.

The common flow path 13 is formed with partition walls 16 disposed between the discrete opening portions 120 adjacent in the X-direction (direction in which the nozzles 3 are arranged or first direction) to extend in the direction (Z-direction) crossing the ejection surface. In the first embodiment, the partition walls 16 are not disposed between all the adjacent discrete opening portions 120.

The partition walls 16 extend in the Y-direction (second direction), while bending, and have wall surfaces crossing the X-direction (first direction). Thus, a pressure fluctuation propagating in the X-direction in the common flow path 13 is reflected by the partition walls 16, and the pressure fluctuation is inhibited from propagating over the entire region of the common flow path 13 extending in the X-direction.

One end portion of each of the partition walls 16 in the Y-direction is in contact with one side wall of the common flow path 13 extending along the X-direction (first direction), while another end portion thereof is apart from another side wall of the common flow path 13 extending along the X-direction (first direction). In the positional relationships along the ejection surface (XY plane), the partition walls 16 do not overlap the connection flow paths 15. This can inhibit the partition walls 16 from excessively controlling a speed of a liquid flow in the common flow path 13.

In the Y-direction (second direction) crossing the X-direction (first direction) along the ejection surface, a length W2 of each of the partition walls 16 is larger than a length W1 of each of the discrete opening portions 120 (W2>W1). This can more reliably inhibit the pressure fluctuation from propagating between the adjacent discrete opening portions 120.

In FIG. 5B, the liquid ejection substrate 2 is formed to have a multilayer configuration including the nozzle substrate 201, the vibration substrate 202, the liquid supply substrate 203, and the flow path formation substrate 204. Each of the substrates may be configured to include a single layer or may also be configured to have a multilayer structure including a plurality of layers or a plurality of substrates.

The nozzle substrate 201 is formed with the nozzles 3 and the pressure chambers 11.

The vibration substrate 202 is formed with depressed portions 24, and the vibration substrate 202 is fixed to the nozzle substrate 201 via vibration plates 17. In spaces formed by the vibration plates 17 and the depressed portions 24, piezoelectric elements 18 serving as actuators that deform the vibration plates 17 are provided. The vibration substrate 202 is provided with the discrete flow paths 12 and, at positions corresponding to positions of the discrete flow paths 12, through holes 121 are formed in the vibration plates 17 to provide communication between the pressure chambers 11 and the discrete flow paths 12.

The liquid supply substrate 203 is provided with the common flow path 13 and the partition walls 16, and the liquid supply substrate 203 is fixed to the vibration substrate 202 to provide communication between the discrete flow paths 12 and the common flow path 13.

The flow path formation substrate 204 is formed with the connection flow paths 15 extending along the first direction (X-direction) and the damper mechanism 301, and the flow path formation substrate 204 is fixed to the liquid supply substrate 203 via an adhesion layer 19. The adhesion layer 19 is not formed in a region corresponding to the common flow path 13, the liquid in the common flow path 13 is in contact with the damper member 300, and the common flow path 13 and the connection flow paths 15 communicate with each other. The damper member 300 is a flexible member that is flexibly deformed with the pressure fluctuation in the liquid in the common flow path 13. A space 22 serving as the damper chamber and the damper member 300 provided so as to have one surface in contact with the liquid in the common flow path 13 and another surface in contact with a gas in the space 22 are included in each of the damper mechanisms 301 that absorb the pressure fluctuation in the liquid in the common flow path 13. The common flow path 13 and the damper mechanisms 301 are formed of the liquid supply substrate 203 serving as a common flow path substrate that forms the side walls of the common flow path 13 and the partition walls 16 and the flow path formation substrate 204 serving as a damper substrate including the damper mechanisms 301 which are fixed to each other via the adhesion layer 19. In a region where the common flow path 13 and the connection flow paths 15 are connected, a through hole or a slit may also be provided in the damper member 300 to form a filter 21. Between each of portions of the liquid supply substrate 203 serving as the common flow path substrate that form the partition walls 16 and the flow path formation substrate 204 serving as the damper substrate, the adhesion layer 19 is not formed, and the partition walls 16 are thereby configured so as not to come into contact with the damper members 300. This can inhibit the presence of the partition walls 16 from inhibiting the flexible deformation or vibration of the damper members 300.

In the liquid ejection substrate 2 in the first embodiment, when a voltage is applied to any of the piezoelectric elements 18 from electric wiring (not shown), the vibration plate 17 is deformed to cause a pressure fluctuation in the liquid in the pressure chamber 11. By applying, to the piezoelectric element 18, the voltage according to a resonance frequency of the pressure chamber 11 containing a liquid 14 and displacing the vibration plate 17 by combining together a direction in which the space in the pressure chamber 11 is enlarged and a direction in which the space in the pressure chamber 11 is reduced, droplets of the liquid 14 are ejected from the nozzles 3. Accordingly, it is possible to eject the liquid 14 from the nozzles 3 in response to a drive signal input to the piezoelectric element 18. The liquid 14 is supplied from the liquid tank (not shown) to the pressure chamber 11 via the external opening portion 20, the connection flow path 15, the common flow path 13, and the discrete flow path 12.

The displacement of the vibration plate 17 resulting from the application of the voltage to the piezoelectric element 18 and the ejection of the liquid 14 from the nozzles 3 causes the pressure fluctuation in the liquid 14 in the pressure chamber 11. This pressure fluctuation propagates to another of the pressure chambers 11 communicating via the discrete flow path 12 and the common flow path 13. When the liquid 14 is ejected in a state where the pressure fluctuation has occurred, an intended change may occur in characteristics of ejected droplets such as a speed of the ejected liquid 14, a volume thereof, and a state of coherence of droplets thereof.

In this respect, in the liquid ejection substrate 2 in the first embodiment, each of the damper mechanisms 301 is disposed at a position facing the discrete opening portion 120 in the common flow path 13 in the direction (Z-direction) crossing the ejection surface, and the pressure fluctuation that has propagated to the common flow path 13 can be reduced using the damper mechanism 301. In addition, between some of the adjacent discrete opening portions 120, the partition walls 16 are provided. Thus, the pressure fluctuation propagating in the X-direction (first direction or longitudinal direction of the common flow path 13) in the space of the common flow path 13 is cut off at positions of the partition walls 16, and the pressure fluctuation is inhibited from propagating over a long distance in the common flow path 13. Since the partition walls 16 are not in contact with the damper member 300, it is possible to inhibit the presence of the partition walls 16 from affecting an effect of reducing the pressure fluctuation achieved by the damper member 300. Thus, the synergetic effect of the partition walls 16 that cut off the pressure fluctuation propagating in the common flow path 13 and the damper mechanisms 301 that absorb the pressure fluctuation can inhibit the pressure fluctuation occurring in a given one of the pressure chambers 11 from affecting another of the pressure chambers 11. As a result, it is possible to reduce crosstalk between the pressure chambers 11 communicating with each other via the common flow path 13 and inhibit unintended fluctuations of the characteristics of the droplets of the liquid 14 ejected from the nozzles 3. This can inhibit quality degradation of printing performed by the recording apparatus 101 having the liquid ejection head module 1 on the recording medium 111.

Note that, in the first embodiment, as each of the damper mechanisms 301, a configuration including the damper member 300 and the space 22 provided in the flow path formation substrate 204 is illustrated by way of example. However, the damper mechanism 301 is not limited to this configuration as long as the damper mechanism 301 has a configuration that reduces the pressure fluctuation by using the deformation of the damper member 300.

Second Embodiment

Figure 6A:
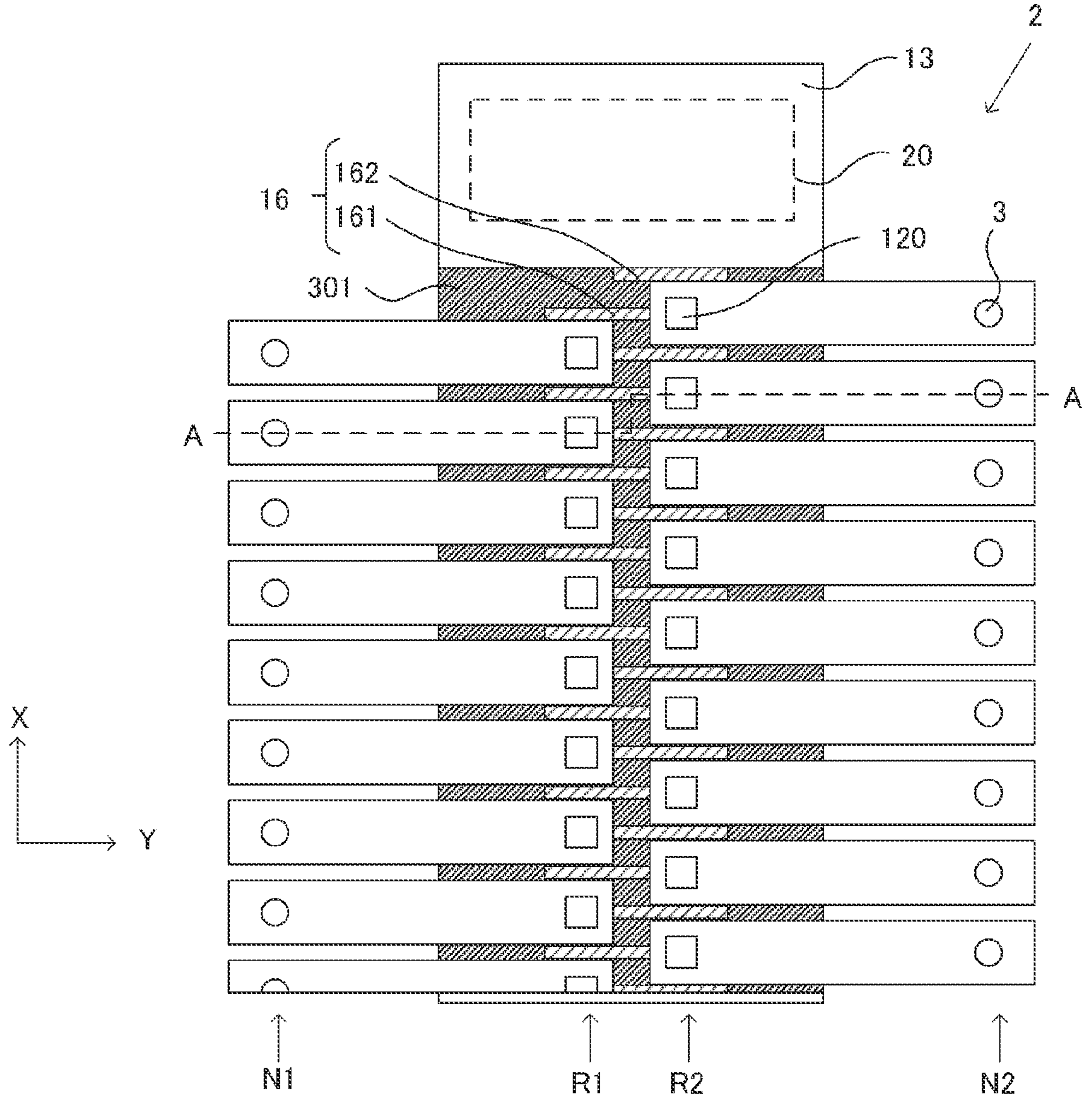
FIG. 6A is a schematic diagram of the liquid ejection substrate according to a second embodiment of the present invention.
Figure 6B:
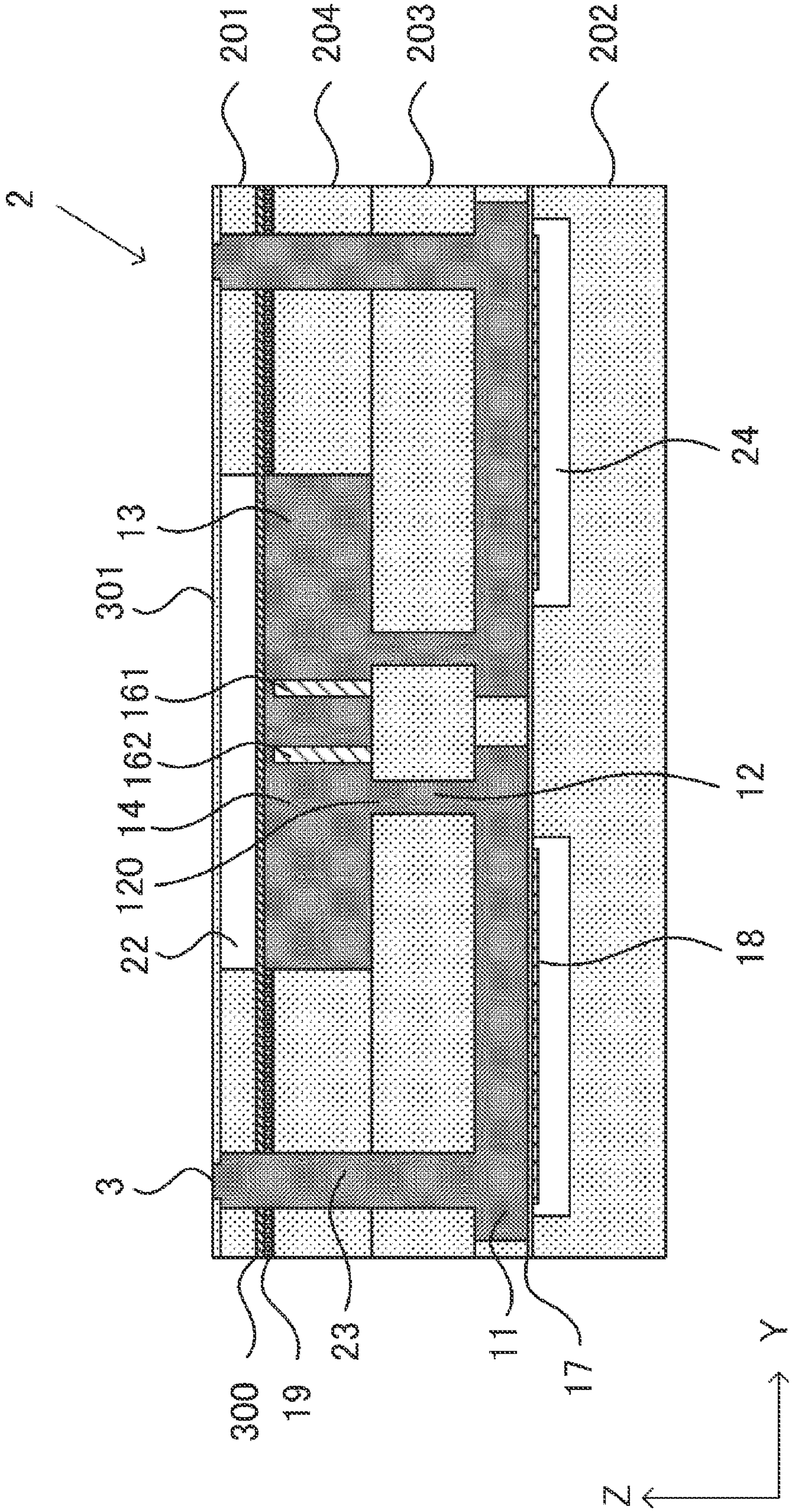
FIG. 6B is a schematic diagram of the liquid ejection substrate according to the second embodiment of the present invention.

Referring to FIGS. 6A and 6B, a description will be given of the liquid ejection substrate in the second embodiment of the present invention. Note that the following description will be given mainly of differences from the first embodiment, and a detailed description of the same configuration as that in the first embodiment is omitted by using the same reference signs as those used in the first embodiment.

FIG. 6A is a plan view illustrating a part of the liquid ejection substrate 2 in the second embodiment. FIG. 6B is a cross-sectional view along the line A-A in FIG. 6A. FIG. 6A illustrates a part of each of two nozzle rows N1 and N2 in the same manner as in FIG. 5A.

The discrete flow paths 12 communicating with the pressure chambers 11 in which the nozzles 3 in the adjacent nozzle rows N1 and N2 are formed communicate with the same common flow path 13. In an end portion of the common flow path 13 in the X-direction, an external opening portion 20 is formed to be connected to a liquid tank (not shown).

The common flow path 13 communicates with the discrete flow paths 12 via the discrete opening portions 120, and the damper mechanisms 301 are disposed so as to face the discrete opening portions 120 in the direction (Z-direction) crossing the ejection surface.

It is assumed that a row of the discrete opening portions 120 corresponding to the nozzles 3 in the first nozzle row N1 is a first discrete opening portion row R1, while a row of the discrete opening portions 120 corresponding to the nozzles 3 in the second nozzle row N2 is a second discrete opening portion row R2.

The partition walls 16 include partition walls 161 disposed between the discrete opening portions 120 in the first discrete opening portion row R1 which are adjacent in the X-direction (direction in which the nozzles 3 are arranged or first direction) and partition walls 162 disposed between the discrete opening portions 120 in the second discrete opening portion row R2 which are adjacent in the X-direction. Each of the partition walls 161 extends in the Y-direction to a position not overlapping the discrete opening portion 120 in the second discrete opening portion row R2, while each of the partition walls 162 extends in the Y-direction to a position not overlapping the discrete opening portion 120 in the first discrete opening portion row R1. The partition walls 161 and the partition walls 162 have respective positions in the Y-direction which partly overlap each other, and are staggered in the positional relationships along the ejection surface (XY plane) to be arranged in the form of comb teeth as a whole.

The partition walls 161 and 162 extend in the Y-direction (second direction) to have wall surfaces crossing the X-direction (first direction). Thus, the pressure fluctuation propagating in the X-direction in the common flow path 13 is reflected by the partition walls 161 and 162, and the pressure fluctuation is inhibited from propagating over the entire region of the common flow path 13 extending in the X-direction.

The partition walls 161 and 162 are apart from wall surfaces of the common flow path 13 extending along the X-direction. This can inhibit the partition walls 161 and 162 from excessively controlling the speed of the liquid flow in the common flow path 13.

In the Y-direction (second direction), lengths of the partition walls 161 and 162 are larger than lengths of the discrete opening portions 120. This can more reliably inhibit the pressure fluctuation from propagating between the adjacent discrete opening portions 120.

In FIG. 6B, the liquid ejection substrate 2 is formed to have the multilayer configuration including the nozzle substrate 201, the flow path formation substrate 204, the liquid supply substrate 203, and the vibration substrate 202. Each of the substrates may be configured as a single layer or may also be configured to have a multilayer structure including a plurality of layers or a plurality of substrates.

The nozzle substrate 201 is formed with the nozzles 3 and the space 22.

The flow path formation substrate 204 is formed with the common flow path 13 and the partition walls 16, and the flow path formation substrate 204 is fixed to the nozzle substrate 201 via the adhesion layer 19. The adhesion layer 19 is not formed in the region corresponding to the common flow path 13, and the liquid in the common flow path 13 is in contact with the damper member 300. The damper member 300 is the flexible member that is flexibly deformed with the pressure fluctuation in the liquid in the common flow path 13. The space 22 and the damper member 300 provided so as to have the one surface in contact with the liquid in the common flow path 13 and the other surface in contact with the gas in the space 22 are included in each of the damper mechanisms 301 that absorb the pressure fluctuation in the liquid in the common flow path 13. The common flow path 13 and the damper mechanisms 301 are formed of the flow path formation substrate 204 serving as the common flow path substrate that forms the side walls of the common flow path 13 and the partition walls 16 and the nozzle substrate 201 serving as the damper substrate including the damper mechanisms 301 which are fixed to each other via the adhesion layer 19.

The liquid supply substrate 203 is formed with the discrete flow paths 12 and the pressure chambers 11, and the liquid supply substrate 203 is fixed to the flow path formation substrate 204 to provide communication between the discrete flow paths 12, the common flow path 13, and the pressure chambers 11.

In the vibration substrate 202, the depressed portions 24 are formed, and the vibration substrate 202 is fixed to the liquid supply substrate 203 via the vibration plates 17. In the spaces formed by the vibration plates 17 and the depressed portions 24, the piezoelectric elements 18 serving as the actuators that deform the vibration plates 17 are provided.

Through flow paths 23 providing communication between the nozzles 3 and the pressure chambers 11 are formed in the nozzle substrate 201, the flow path formation substrate 204, and the liquid supply substrate 203.

In the second embodiment, the liquid 14 from the liquid tank (not shown) is ejected from the nozzles 3 via the external opening portions 20, the common flow path 13, the discrete flow paths 12, the pressure chambers 11, and the through flow paths 23. The liquid 14 supplied to the common flow path 13 is supplied to the pressure chambers 11 through the spaces between the partition walls 161 and 162 arranged in the form of comb teeth.

In the second embodiment, the partition walls 16 are disposed between the discrete opening portions 120 adjacent in the X-direction, and therefore it is possible to inhibit the propagation of the pressure fluctuation to the pressure chamber 11 adjacent in the X-direction, which is significantly affected by the propagation of the pressure fluctuation. In addition, since the partition walls 16 are arranged in the form of comb teeth in a middle portion of the common flow path 13 in the Y-direction, and are not provided in the vicinities of the both end portions of the common flow path in the Y-direction, and open spaces are provided, the pressure fluctuation propagates in the vicinities of the both end portions of the common flow path in the Y-direction. Accordingly, it is also possible to inhibit the propagation of the pressure fluctuation to the pressure chamber 11 adjacent in the Y-direction.

In the second embodiment also, between each of the partition walls 16 and the damper member 300, the adhesion layer 19 is not formed, and the partition wall 16 and the damper member 300 are not in contact with each other, and therefore it is possible to inhibit the presence of the partition walls 16 from affecting the effect of reducing the pressure fluctuation achieved by the damper member 300. The synergetic effect of the partition walls 16 that cut off the pressure fluctuation propagating in the common flow path 13 and the damper mechanisms 301 that absorb the pressure fluctuation can inhibit the pressure fluctuation occurring in a given one of the pressure chambers 11 from affecting another of the pressure chambers 11. As a result, it is possible to reduce the crosstalk between the pressure chambers 11 communicating with each other via the common flow path 13 and inhibit the unintended fluctuations of the characteristics of the droplets of the liquid 14 ejected from the nozzles 3. This can inhibit the quality degradation of the printing performed by the recording apparatus 101 having the liquid ejection head module 1 on the recording medium 111.

Note that, in the second embodiment, as each of the damper mechanisms 301, a configuration including the damper member 300 and the space 22 provided in the nozzle substrate 201 is illustrated by way of example. However, the damper mechanism 301 is not limited to this configuration as long as the damper mechanism 301 has a configuration that reduces the pressure fluctuation by using the deformation of the damper member 300. For example, it may also be possible to adopt a configuration in which an opening is provided in a surface of the nozzle substrate 201 facing the damper member 300 via the space 22 or a configuration in which the damper member 300 is not provided, but a nozzle-shaped opening is provided in a wall surface between the space 22 and the common flow path 13 to form a meniscus for the liquid 14.

Third Embodiment

Figure 7A:
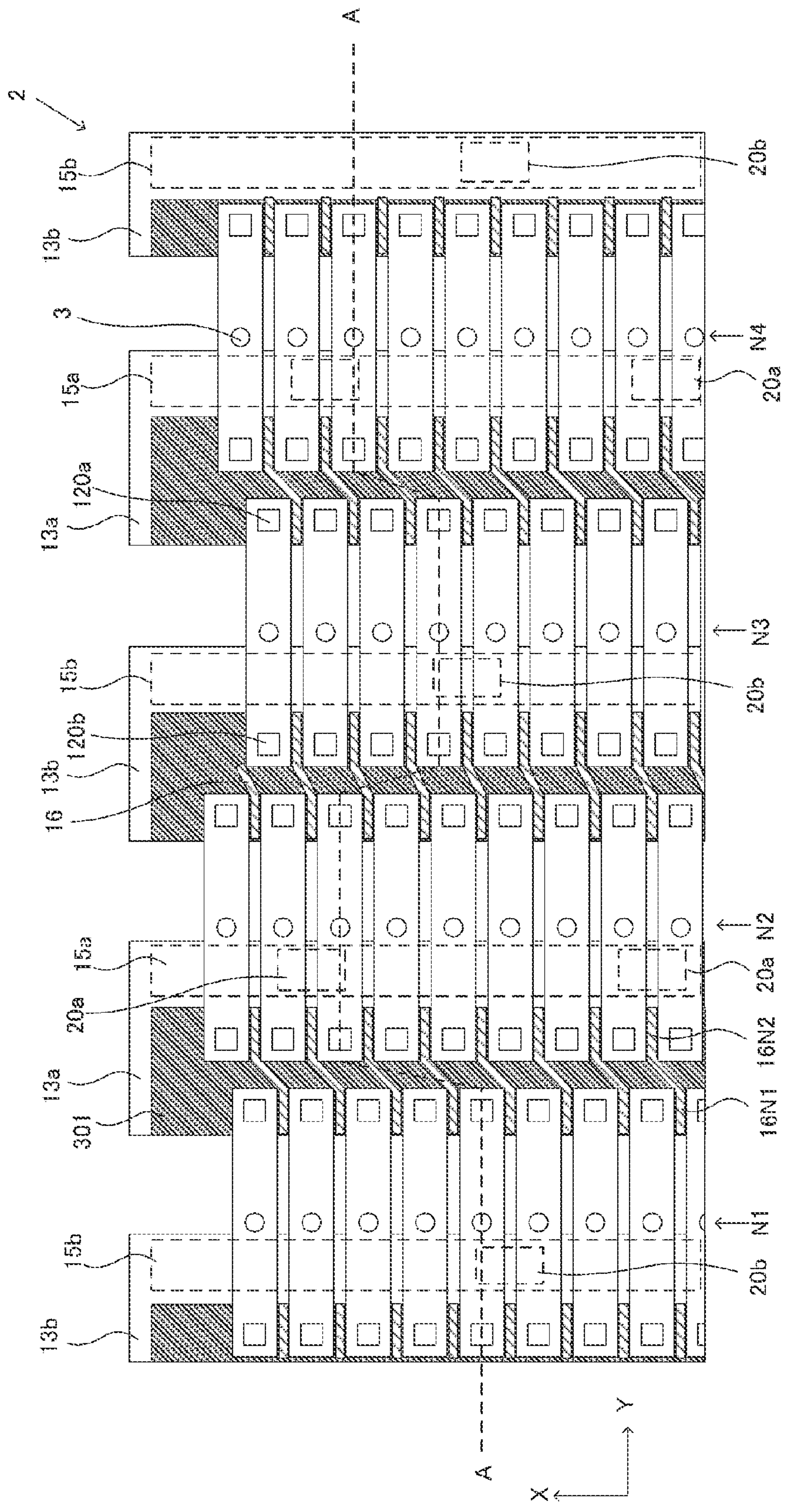
FIG. 7A is a schematic diagram of the liquid ejection substrate according to a third embodiment of the present invention.
Figure 7B:
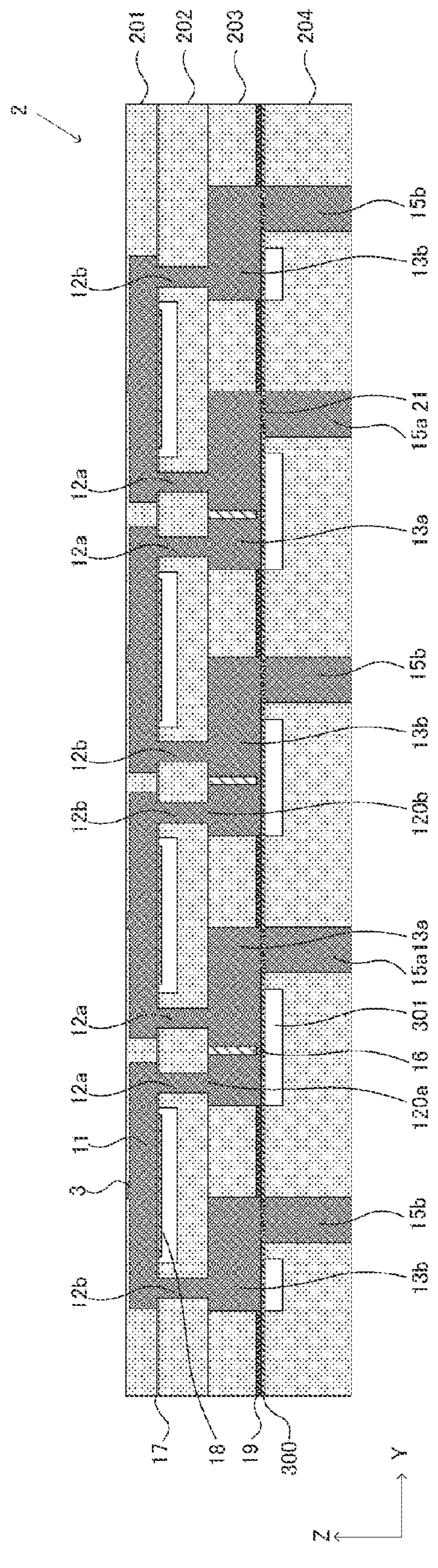
FIG. 7B is a schematic diagram of the liquid ejection substrate according to the third embodiment of the present invention.

Referring to FIGS. 7A and 7B, a description will be given of the liquid ejection substrate in the third embodiment of the present invention. Note that the following description will be given mainly of differences from the first embodiment, and a detailed description of the same configuration as that in the first embodiment is omitted by using the same reference signs as those used in the first embodiment.

FIG. 7A is a plan view illustrating a part of the liquid ejection substrate 2 in the third embodiment. FIG. 7B is a cross-sectional view along the line A-A in FIG. 7A. FIGS. 7A and 7B illustrate a part of each of the four nozzle rows N1, N2, N3, and N4.

In the vicinity of the middle of each of the pressure chambers 11 in the Y-direction (longitudinal direction of the pressure chamber 11), the nozzles 3 are formed to communicate with each of the discrete supply flow path 12*a* and the discrete discharge flow path 12*b* in the vicinities of the both end portions thereof in the Y-direction. The pressure chambers 11 communicate with the common supply flow paths 13*a* and the supply connection flow paths 15*a* via the discrete supply flow paths 12*a*, while the supply connection flow paths 15*a* communicate with an external ink tank via the external supply opening portions 20*a*. The pressure chambers 11 are connected to the common discharge flow paths 13*b* and the discharge connection flow paths 15*b* via the discrete discharge flow paths 12*b*, while the discharge connection flow paths 15*b* communicate with the external ink tank via the external discharge opening portions 20*b*.

The common supply flow paths 13*a* communicate with the discrete supply flow paths 12*a* via the discrete supply opening portions 120*a*, and the damper mechanisms 301 are disposed so as to face the discrete supply opening portions 120*a* in the direction (Z-direction) crossing the ejection surface. The common discharge flow paths 13*b* communicate with the discrete discharge flow paths 12*b* via the discrete discharge opening portions 120*b*, and the damper mechanisms 301 are disposed so as to face the discrete discharge opening portions 120*b* in the direction (Z-direction) crossing the ejection surface.

In the third embodiment, the liquid 14 supplied from the liquid tank (not shown) circulates in the liquid tank via the external supply opening portions 20*a*, the supply connection flow paths 15*a*, the pressure chambers 11, the discharge connection flow paths 15*b*, and the external discharge opening portions 20*b*. Such circulation of the liquid 14 is implemented by, e.g., providing a predetermined pressure difference between the supply connection flow paths 15*a* and the discharge connection flow paths 15*b*. By causing the liquid 14 to circulate, it is possible to inhibit an increase in the vicinity of the liquid 14 in the vicinities of the nozzles 3 due to vaporization of the liquid 14 from the nozzles 3. In a configuration in the third embodiment, structures of a supply system and a discharge system are symmetrical, and accordingly it is also possible to reverse a direction of the circulation of the liquid 14.

The discrete supply flow paths 12*a* communicating with the pressure chambers 11 in which the nozzles 3 in the adjacent nozzles rows N1 and N2 are formed communicate with the same common supply flow path 13*a*. The discrete discharge flow paths 12*b* communicating with the pressure chambers 11 in which the nozzles 3 in the adjacent nozzle rows N2 and N3 are formed communicate with the same common discharge flow path 13*b*. The same applies also to the adjacent nozzle rows N3 and N4.

The common supply flow paths 13*a* communicate with the discrete supply flow paths 12*a* via the discrete supply opening portions 120*a*, and the damper mechanisms 301 are disposed so as to face the discrete supply opening portions 120*a* in the direction (Z-direction) crossing the ejection surface.

The common discharge flow paths 13*b* communicate with the discrete discharge flow paths 12*b* via the discrete discharge opening portions 120*b*, and the damper mechanisms 301 are disposed so as to face the discrete discharge opening portions 120 in the direction (Z-direction) crossing the ejection surface.

In the third embodiment, in the direction (Z-direction) crossing the ejection surface, the common flow paths 13*a* and 13*b* and the damper mechanisms 301 are disposed opposite to the nozzles 3 with respect to the pressure chambers 11. In other words, a configuration is provided in which the common flow paths 13*a* and 13*b* and the damper mechanisms 301 are provided in the liquid supply substrate 203 located opposite to the nozzle substrate 201 with respect to the vibration substrate 202. The flow paths (which are the through flow paths 23 in the second embodiment) connecting the nozzles 3 and the pressure chambers 11 are shorter than those in the configuration in the second embodiment (FIGS. 6A and 6B) in which the common flow path 13 and the damper mechanism 301 are provided on the same side as that of the nozzle substrate 201 with respect to the vibration substrate 202. Consequently, it is possible to more efficiently guide a circulating flow of the liquid 14 to the nozzles 3. Therefore, it is possible to more effectively inhibit the increased viscosity of the liquid 14 in the nozzles 3.

In the common supply flow paths 13*a*, the partition walls 16 are formed to be disposed between the discrete supply opening portions 120*a* adjacent in the X-direction (direction in which the nozzles 3 are arranged or first direction) and extend in the direction (Z-direction) crossing the ejection surface. Partition walls 16N1 disposed between the discrete supply opening portions 120*a* corresponding to the nozzle row N1 and partition walls 16N2 disposed between the discrete supply opening portions 120*a* corresponding to the nozzle row N2 at a position adjacent to the discrete supply opening portions 120*a* are formed integrally.

Likewise, in the common discharge flow paths 13*b*, the partition walls 16 are formed to be disposed between the discrete discharge opening portions 120*b* adjacent in the X-direction (direction in which the nozzles 3 are arranged or first direction) and extend in the direction (Z-direction) crossing the ejection surface.

The partition walls 16 extend in the Y-direction (second direction), while bending, and the wall surfaces thereof cross the X-direction (first direction). Thus, a pressure fluctuation propagating in the X-direction in the common supply flow paths 13*a* and the common discharge flow paths 13*b* is reflected by the partition walls 16, and the pressure fluctuation is inhibited from propagating over the entire region of the common supply flow paths 13*a* and the common discharge flow paths 13*b* each extending in the X-direction.

One end portion of each of the partition walls 16 in the Y-direction is in contact with one side wall of the common supply flow path 13*a* extending along the X-direction (first direction), while another end portion thereof is apart from another wall surface of the common supply flow path 13*a* extending along the X-direction (first direction). In the positional relationships along the ejection surface (XY plane), the partition walls 16 do not overlap the supply connection flow paths 15*a*.

One end portion of each of the partition walls 16 in the Y-direction is in contact with one side wall of the common discharge flow path 13*b* extending along the X-direction (first direction), while another end portion thereof is apart from another wall surface of the common discharge flow path 13*b* extending along the X-direction (first direction). In the positional relationships along the ejection surface (XY plane), the partition walls 16 do not overlap the discharge connection flow paths 15*b*.

This can inhibit the partition walls 16 from excessively controlling a speed of a liquid flow in the common supply flow paths 13*a* and the common discharge flow paths 13*b*.

In FIG. 7B, the liquid ejection substrate 2 is formed to have the multilayer configuration including the nozzle substrate 201, the vibration substrate 202, the liquid supply substrate 203, and the flow path formation substrate 204. Each of the substrates may be configured as a single layer or may also be configured to have a multilayer structure including a plurality of layers or a plurality of substrates.

In the third embodiment, the pressure fluctuation occurring in the pressure chamber 11 into which the liquid 14 is ejected propagates to the common supply flow path 13*a* via the discrete supply flow path 12*a*, and propagates to the common discharge flow path 13*b* via the discrete discharge flow path 12*b*. However, the partition walls 16 cut off the pressure fluctuation propagating in the X-direction (first direction or direction in which the nozzles 3 are arranged) in the common supply flow path 13*a* and the common discharge flow path 13*b*. Thus, the pressure fluctuation is inhibited from propagating over a long distance in the common supply flow path 13*a* and the common discharge flow path 13*b*. In addition, the damper mechanism 301 absorbs the pressure fluctuation, and consequently influence of the propagation of the pressure fluctuation in the Y-direction (second direction or direction in which the nozzle rows N1, N2, . . . are arranged) is also reduced. In the same manner as in the other embodiments, each of the partition walls 16 and the damper member 300 are not in contact with each other, and therefore it is possible to inhibit the presence of the partition walls 16 from affecting the effect of reducing the pressure fluctuation achieved by the damper member 300. Thus, the synergetic effect of the partition walls 16 that cut off the pressure fluctuation propagating in the common flow path 13 and the damper mechanisms 301 that absorb the pressure fluctuation can inhibit the pressure fluctuation occurring in a given one of the pressure chambers 11 from affecting another of the pressure chambers 11. As a result, it is possible to reduce the crosstalk between the pressure chambers 11 communicating with each other via the common flow path 13 and inhibit the unintended fluctuations of the characteristics of the droplets of the liquid 14 ejected from the nozzles 3. This can inhibit quality degradation of the printing performed by the recording apparatus 101 having the liquid ejection head module 1 on the recording medium 111.

Note that, by controlling the timing of the ejection of the liquid 14 such that the liquid 14 is ejected at different timings in the adjacent nozzle rows, it is also possible to further reduce the influence of the crosstalk between the adjacent nozzle rows.

Fourth Embodiment

Figure 8A:
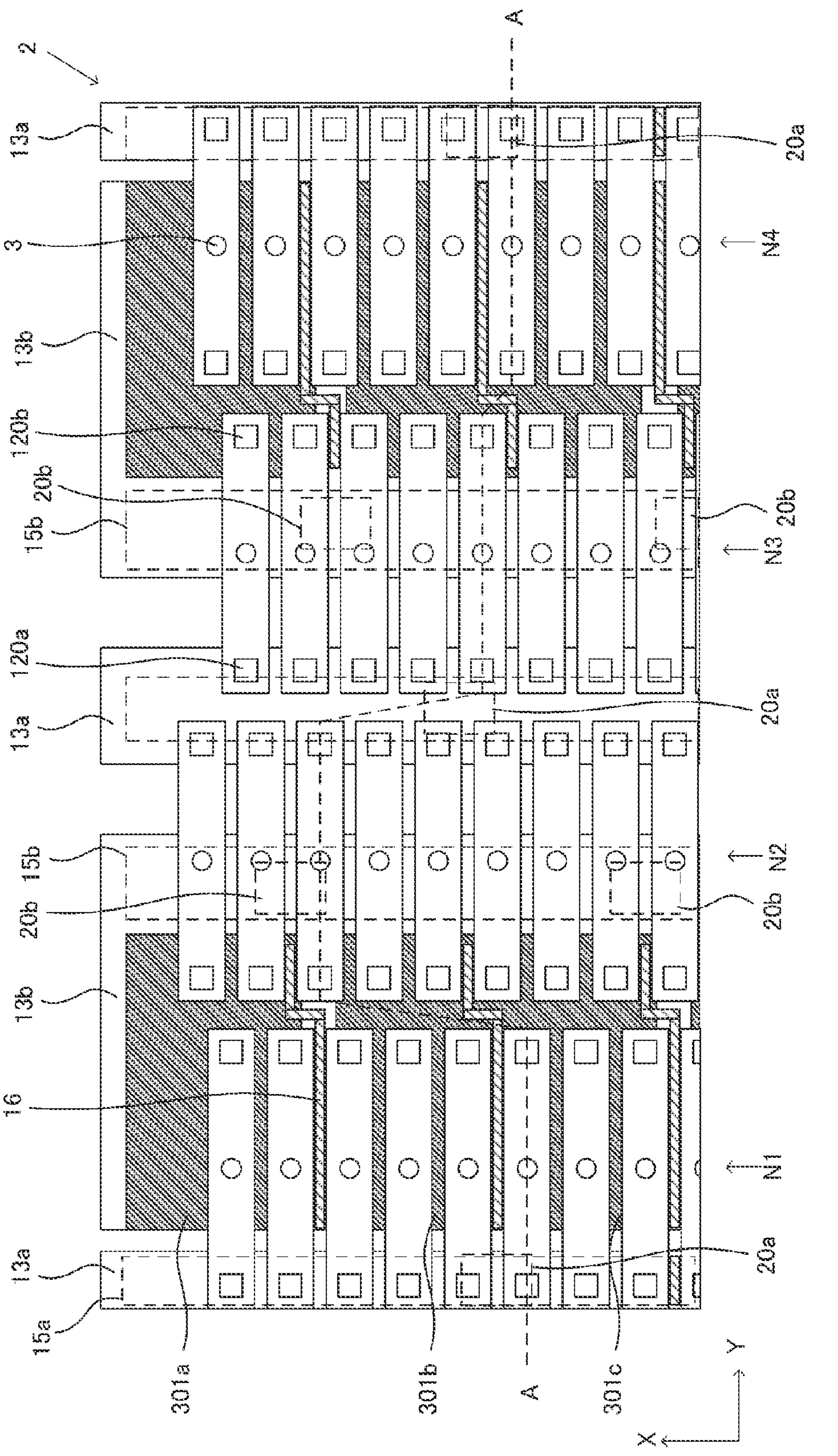
FIG. 8A is a schematic diagram of the liquid ejection substrate according to a fourth embodiment of the present invention.
Figure 8B:
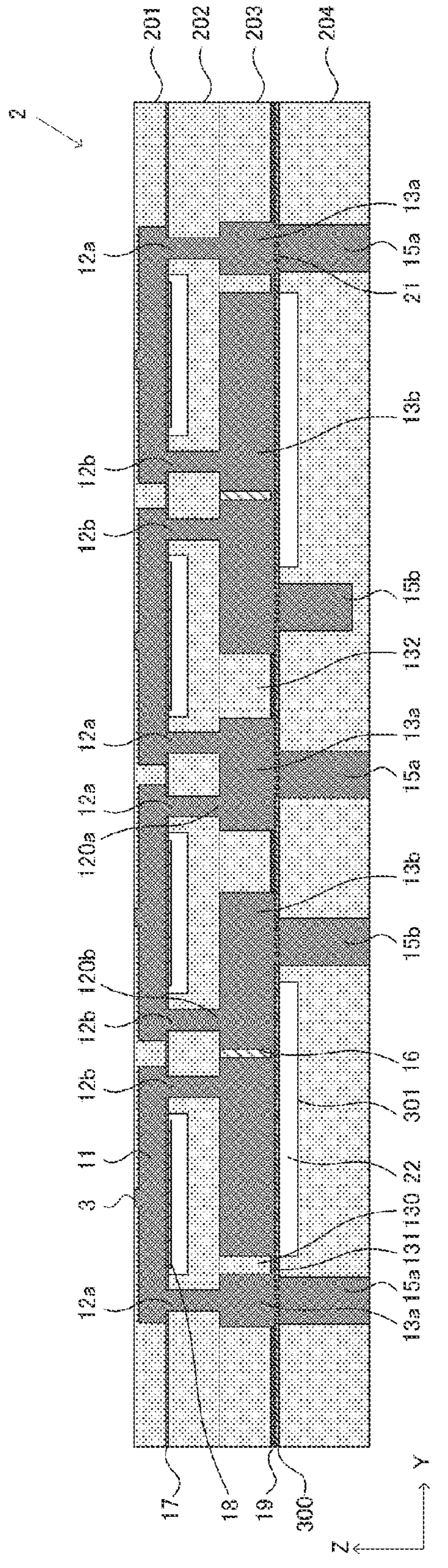
FIG. 8B is a schematic diagram of the liquid ejection substrate according to the fourth embodiment of the present invention.

Referring to FIGS. 8A and 8B, a description will be given of the liquid ejection substrate in the fourth embodiment of the present invention. Note that the following description will be given mainly of differences from the first embodiment, and a detailed description of the same configuration as that in the first embodiment is omitted by using the same reference signs as those used in the first embodiment.

FIG. 8A is a plan view illustrating a part of the liquid ejection substrate 2 in the fourth embodiment. FIG. 8B is a cross-sectional view along the line A-A in FIG. 8A. FIGS. 8A and 8B illustrate a part of each of the four nozzle rows N1, N2, N3, and N4.

In contrast to the third embodiment, in the fourth embodiment, the damper mechanisms 301 are not disposed in the common supply flow paths 13*a*, but are disposed only in the common discharge flow paths 13*b*. A dimension of each of the damper mechanisms 301 in the Y-direction (direction in which the nozzle rows are arranged) is larger than that in the third embodiment. Accordingly, it is possible to obtain a larger amplitude of the damper member 300. The common discharge flow paths 13*b* communicate with the discrete discharge flow paths 12*b* via the discrete discharge opening portions 120*b*, and the damper mechanisms 301 are disposed so as to face the discrete discharge opening portions 120*b* in the direction (Z-direction) crossing the ejection surface.

The discrete supply flow paths 12*a* and the discrete discharge flow paths 12*b* are designed such that respective flow path resistances thereof are equal, and a pressure difference is provided such that a pressure in each of the discharge connection flow paths 15*b* is lower than that in each of the supply connection flow paths 15*a*. As a result, a circulating flow of the liquid 14 flowing from the supply connection flow path 15*a* to the discharge connection flow path 15*b* via the discrete supply flow path 12*a*, the pressure chamber 11, and the discrete discharge flow path 12*b* is formed. In this case, the pressure fluctuation caused by the ejection is more likely to propagate to the discrete discharge flow path 12*b* at a relatively low pressure than to the discrete supply flow path 12*a* at a relatively high pressure. Therefore, in a configuration in which the damper mechanisms 301 are provided in either of the common supply flow paths 13*a* and the common discharge flow paths 13*b*, the damper mechanisms 301 disposed in the common discharge flow paths 13*b* allow a higher crosstalk inhibiting effect to be obtained. When the damper mechanisms 301 are disposed in the common discharge flow paths 13*b*, it may also be possible to design each of the discrete supply flow paths 12*a* and the discrete discharge flow paths 12*b* such that the flow path resistance of the discrete discharge flow path 12*b* is smaller than that the discrete supply flow path 12*a* and that the pressure fluctuation due to the ejection is more likely to propagate to the common discharge flow paths 13*b*.

In the common supply flow paths 13*a*, the plurality of external supply opening portions 20*a* to which the liquid is supplied from the outside are arranged along the X-direction. In the common discharge flow paths 13*b*, the plurality of external discharge opening portions 20*b* through which the liquid is discharged to the outside are arranged along the X-direction.

In the fourth embodiment, in the common flow paths in which the damper mechanisms 301 are disposed, the partition walls are provided. In the fourth embodiment, the damper mechanisms 301 are disposed in the common discharge flow paths 13*b*, and accordingly the partition walls 16 are provided in the common discharge flow paths 13*b*. Specifically, in the common discharge flow paths 13*b*, the partition walls 16 are formed to be disposed between the discrete discharge opening portions 120*b* adjacent in the X-direction (direction in which the nozzles 3 are arranged or first direction) and extend in the direction (Z-direction) crossing the ejection surface. In the fourth embodiment, in the same manner as in the first embodiment, the partition walls 16 are not disposed between all the adjacent discrete discharge opening portions 120*b*, but are formed at positions of the external discharge opening portions 20*b* in the X direction and at positions between the external discharge opening portions 20*b* in the X direction. Accordingly, intervals between the plurality of partition walls 16 in the X-direction (first direction) are smaller than intervals between the plurality of external discharge opening portions 20*b* in the X-direction.

Note that it may also be possible to adopt a configuration in which the damper mechanisms 301 are disposed only in the common supply flow paths 13*a*. In that case, it may also be possible to provide the partition walls 16 in the common supply flow paths 13*a* and form the partition walls 16 at positions of the external supply opening portions 20*a* in the X-direction and at positions between the external supply opening portions 20*a* in the X-direction. In this case, the intervals between the plurality of partition walls 16 in the X-direction (first direction) are smaller than the intervals between the plurality of external supply opening portions 20*a* in the X-direction. In the first embodiment also, when the plurality of external opening portions 20 are provided along the X-direction (first direction) in the connection flow paths 15, the positional relationship between the external opening portions 20 and the partition walls 16 in the X-direction may also be the same as that in the fourth embodiment. In other words, the intervals between the plurality of partition walls 16 in the X-direction (first direction) may also be set smaller than the intervals between the plurality of external opening portions 20 in the X-direction. The positions of the partition walls 16 in the X-direction may also be positions of the external opening portions 20 in the X-direction and positions between the external opening portions 20 in the X-direction.

The partition walls 16 extend in the Y-direction (second direction), while bending, and have the wall surfaces crossing the X-direction (first direction). Thus, at the positions at which the partition walls 16 are provided, spaces in the common discharge flow paths 13*b* are partially partitioned in the X-direction. The pressure fluctuation propagating in the X-direction in the common discharge flow paths 13*b* is reflected by the partition walls 16, and the pressure fluctuation is inhibited from propagating over the entire region of the common flow path 13 extending in the X-direction. Note that, in the same manner as in the first embodiment, in each of portions in which the partition walls 16 are formed, the adhesion layer 19 is not formed such that vibration absorption performance of the damper member 300 is not inhibited by the partition walls 16.

One end portion of each of the partition walls 16 in the Y-direction is in contact with one side wall of the common discharge flow path 13*b* extending along the X-direction (first direction), while another end portion thereof is apart from another side wall of the common discharge flow path 13*b* extending along the X-direction (first direction). In the positional relationships along the ejection surface (XY plane), the partition walls 16 do not overlap the discharge connection flow paths 15*b*. This can inhibit the partition walls 16 from excessively controlling a speed of a liquid flow in the common discharge flow path 13*b*.

In the fourth embodiment, in the same manner as in the first embodiment, the liquid supply substrate 203 is formed with the common supply flow paths 13*a*, the common discharge flow paths 13*b*, and the partition walls 16. The flow path formation substrate 204 is formed with the supply connection flow paths 15*a*, the discharge connection flow paths 15*b*, and the damper mechanisms 301 each extending along the first direction (X-direction). The flow path formation substrate 204 is fixed to the liquid supply substrate 203 via the adhesion layer 19. The adhesion layer 19 is not formed in regions corresponding to the common supply flow paths 13*a* and the common discharge flow paths 13*b*, and the liquid in the common discharge flow paths 13*b* is in contact with the damper member 300. Each of the common flow paths 13*a* and 13*b* and the damper mechanisms 301 are formed of the liquid supply substrate 203 serving as the common flow path substrate that forms the side walls of the common flow path and the partition walls 16 and the flow path formation substrate 204 serving as the damper substrate including the damper mechanisms 301 which are fixed to each other via the adhesion layer 19. Between the portions of the liquid supply substrate 203 serving as the common flow path substrate that form the partition walls 16 and the flow path formation substrate 204 serving as the damper substrate, the adhesion layer 19 is not formed, and accordingly the partition walls 16 are configured so as not to come into contact with the damper member 300. In addition, between the portions of the liquid supply substrate 203 serving as the common flow path substrate that form side walls 130 separating the common supply flow paths 13*a* and the common discharge flow paths 13*b* from each other and the flow path formation substrate 204 serving as the damper substrate also, the adhesion layer 19 is not formed. As a result, the common supply flow paths 13*a* and the common discharge flow paths 13*b* communicate with each other.

An advantage of not forming the adhesion layer 19 in each of the portions in which the side walls 130 separating the common supply flow paths 13*a* and the common discharge flow paths 13*b* from each other are formed is that a width of each of the damper mechanisms 301 in the Y-direction can be ensured. In other words, to form the adhesion layer 19 in a portion having a small width in the Y-direction, such as each of the side walls 130 separating the common supply flow paths 13*a* and the common discharge flow paths 13*b* from each other, according to accuracy of formation of the adhesion layer 19, the width of the side wall 130 in the Y-direction needs to have a given or larger dimension. To ensure the width of the side wall 130 in the Y-direction, it is necessary to accordingly reduce a width of each of the damper mechanisms 301 in the Y-direction, resulting in degradation of the vibration absorption performance of the damper mechanism 301. By not forming the adhesion layer 19 in each of the portions with the side walls 130, it is possible to ensure the width of the damper mechanism 301 in the Y-direction and ensure the vibration absorption performance.

When the adhesion layer 19 is not formed in each of the portions with the side walls 130, in the portion with the side wall 130, a communication path 131 corresponding to a thickness of the adhesion layer 19 is formed between the common supply flow path 13*a* and the common discharge flow path 13*b*. Since the communication path 131 has a sufficiently high flow path resistance, by providing a predetermined pressure difference between the supply connection flow path 15*a* and the discharge connection flow path 15*b*, even when the communication path 131 is present, it is possible to obtain a sufficient circulating flow speed of the liquid 14. Therefore, it is possible to inhibit the increased viscosity of the liquid 14 in the nozzles 3 due to the vaporization of the liquid 14.

Note that, in a portion with a side wall 132 having a large width in the Y-direction among the side walls separating the common supply flow paths 13*a* and the common discharge flow paths 13*b* from each other, the adhesion layer 19 may be formed in the same manner as in the other embodiments.

In the fourth embodiment, the damper member 300 is divided in the X-direction into a plurality of portions 301*a*, 301*b*, and 301*c*. This is because the width (dimension in the Y-direction) of each of the damper mechanisms 301 is sufficiently large and, even when the damper member 300 is divided in the X-direction, a sufficient vibration absorbing effect can be obtained. By dividing the damper member 300 in the longitudinal direction (X-direction) of the space in each of the common discharge flow paths 13_b_, it is possible to inhibit the damper member 300 that is elongated in the X-direction from excessively vibrating. This can reduce the crosstalk propagating in the longitudinal direction (X-direction) of the space in the common discharge flow path 13_b_.

The foregoing configuration can inhibit a pressure fluctuation in the pressure chamber 11 caused by the ejection of the liquid 14 resulting from the driving of the piezoelectric element 18 by using a synergetic effect of the damper mechanism 301 and the partition wall 16 in each of the common discharge flow paths 13_b_. Therefore, it is possible to inhibit the propagation of the pressure fluctuation to the communicating pressure chamber 11 and reduce fluctuations in the ejection characteristics of the liquid ejected from each of the nozzles 3, which can reduce color unevenness of a printed image on the recording medium.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-48587, filed on Mar. 24, 2022, which is hereby incorporated by reference herein in its entirety.

What is claimed is:

1. A liquid ejection head configured to eject a liquid from an ejection surface, the liquid ejection head comprising:

a plurality of nozzles arranged along a first direction of the ejection surface;

a plurality of pressure chambers communicating with the plurality of individual nozzles and provided with actuators configured to apply, to the liquid, pressures for ejecting the liquid from the nozzles;

a plurality of discrete flow paths communicating with the plurality of individual pressure chambers;

a common flow path communicating with the plurality of individual discrete flow paths via discrete opening portions and extending in the first direction; and a damper mechanism disposed to face the common flow path in a direction crossing the ejection surface to absorb a pressure fluctuation in the liquid in the common flow path, the common flow path being provided with a partition wall disposed between the discrete opening portions adjacent in the first direction to extend in the direction crossing the ejection surface.

2. The liquid ejection head according to claim 1, wherein a plurality of the partition walls are arranged along the first direction.

3. The liquid ejection head according to claim 1, wherein the partition wall is kept from contact with the damper mechanism.

4. The liquid ejection head according to claim 1, wherein, in a second direction extending along the ejection surface and crossing the first direction, a length of the partition wall is longer than a length of each of the discrete opening portions.

5. The liquid ejection head according to claim 1, wherein, in the direction crossing the ejection surface, each of the common flow path and the damper mechanism is disposed opposite to the nozzles with respect to the pressure chambers.

6. The liquid ejection head according to claim 1, wherein the common flow path and the damper mechanism are formed of a common flow path substrate and a damper substrate which are fixed to each other via an adhesion layer, the common flow path substrate forming each of a side wall of the common flow path and the partition wall, and the damper substrate including the damper mechanism, and wherein, between a portion of the common flow path substrate that forms the partition wall and the damper substrate, the adhesion layer is not provided.

7. The liquid ejection head according to claim 1, wherein the damper mechanism includes a damper chamber extending along the first direction and a flexible member provided so as to have one surface in contact with the liquid in the common flow path and another surface in contact with a gas in the damper chamber.

8. The liquid ejection head according to claim 1, wherein, in the direction crossing the ejection surface, each of the common flow path and the damper mechanism is disposed on the same side as that of the nozzles with respect to the pressure chambers.

9. The liquid ejection head according to claim 1, wherein the partition wall is disposed apart from a side wall of the common flow path extending along the first direction.

10. The liquid ejection head according to claim 1, wherein the common flow path is provided with a plurality of external opening portions arranged along the first direction to communicate with the outside, and wherein an interval in the first direction between a plurality of the partition walls arranged along the first direction is shorter than an interval in the first direction between the plurality of external opening portions.

11. The liquid ejection head according to claim 1, wherein the discrete flow paths include discrete supply flow paths configured to supply the liquid to the pressure chambers and discrete discharge flow paths configured to discharge the liquid from the pressure chambers, wherein the common flow path includes common supply flow paths that communicate with the plurality of discrete supply flow paths via discrete supply opening portions and common discharge flow paths that communicate with the plurality of discrete discharge flow paths via discrete discharge opening portions, wherein the damper mechanism is disposed so as to face at least either of the common supply flow path and the common discharge flow path in the direction crossing the ejection surface, and the partition wall is provided in the common flow path facing at least the damper mechanism.

12. The liquid ejection head according to claim 1, wherein each of the common supply flow paths, each of the common discharge flow paths, and the damper mechanism are formed of a common flow path substrate and a damper substrate which are fixed to each other via an adhesion layer, the common flow path substrate forming respective side walls of the common supply flow path and the common discharge flow path and the partition wall, and the damper substrate including the damper mechanism, and wherein, between a portion of the common flow path substrate that forms a side wall separating the common supply flow path and the common discharge flow path from each other and the damper substrate, the adhesion layer is not provided.

13. The liquid ejection head according to claim 1, wherein the common supply flow paths are provided with a plurality of external supply opening portions to which the liquid is supplied from the outside and which are arranged along the first direction, wherein the common discharge flow paths are provided with a plurality of external discharge opening portions which discharge the liquid to the outside and which are arranged along the first direction, and wherein an interval in the first direction between a plurality of the partition walls arranged along the first direction is shorter than an interval in the first direction between the plurality of external supply opening portions or smaller than an interval in the first direction between the plurality of external discharge opening portions.

14. A liquid ejection head configured to eject a liquid from an ejection surface, the liquid ejection head comprising:

a plurality of nozzles arranged along a first direction of the ejection surface;

a plurality of pressure chambers communicating with the plurality of individual nozzles and provided with actuators configured to apply, to the liquid, pressures for ejecting the liquid from the nozzles;

a plurality of discrete flow paths communicating with the plurality of individual pressure chambers;

a common flow path communicating with the plurality of individual discrete flow paths and extending in the first direction; and a damper mechanism disposed to face the common flow path in a direction crossing the ejection surface to absorb a pressure fluctuation in the liquid in the common flow path, the common flow path being provided with a partition wall that partially blocks a flow of the liquid along the first direction.

* * * * *